United States Patent [19]

Ikemoto et al.

[11] Patent Number: 4,973,080

[45] Date of Patent: Nov. 27, 1990

[54] HYDRAULIC SUSPENSION SYSTEM FOR A VEHICLE WITH LESS ABRUPT CHANGE IN VEHICLE HEIGHT WHEN STARTED

[75] Inventors: Hiroyuki Ikemoto, Susono; Shuuichi Buma, Toyota; Kaoru Ohashi, Okazaki; Toshio Aburaya, Toyota; Takashi Yonekawa, Mishima; Toshio Oonuma; Kunihito Sato, both of Susono; Masaki Kawanishi; Toshiaki Hamada, both of Toyota; Kouichi Kokubo, Nagoya; Shinichi Tagawa, Toyota, all of Japan

[73] Assignees: Toyota Jidosha Kabushiki Kaisha; Aisin Seiki Kabushiki Kaisha, both of Aichi, Japan

[21] Appl. No.: 444,761

[22] Filed: Dec. 1, 1989

[30] Foreign Application Priority Data

| Dec. 5, 1988 | [JP] | Japan | 63-307188 |
| Mar. 1, 1989 | [JP] | Japan | 1-50732 |
| Jun. 14, 1989 | [JP] | Japan | 1-151962 |
| Aug. 23, 1989 | [JP] | Japan | 1-217083 |
| Aug. 28, 1989 | [JP] | Japan | 1-221132 |

[51] Int. Cl.$^5$ .................................. B60G 11/26
[52] U.S. Cl. .................................. 280/707; 280/709; 280/714; 280/840
[58] Field of Search ............... 280/708, 709, 714, 840, 280/DIG. 1, 707; 180/41

[56] References Cited

U.S. PATENT DOCUMENTS

| 4,630,527 | 12/1986 | Quin | 280/714 |
| 4,659,104 | 4/1987 | Tanaka et al. | 280/714 |
| 4,869,528 | 9/1989 | Buma et al. | 280/840 |
| 4,877,263 | 10/1989 | Konishi et al. | 280/707 |
| 4,887,840 | 12/1989 | Harara et al. | 280/707 |

FOREIGN PATENT DOCUMENTS

| 60-197418 | 10/1985 | Japan . |
| 61-215104 | 9/1986 | Japan . |
| 62-194918 | 8/1987 | Japan . |
| 62-202404 | 12/1987 | Japan . |
| 63-4706 | 1/1988 | Japan . |
| 63-106132 | 5/1988 | Japan . |
| 63-134320 | 6/1988 | Japan . |

Primary Examiner—Richard A. Bertsch
Attorney, Agent, or Firm—Oliff & Berridge

[57] ABSTRACT

In a hydraulic suspension system, a plurality of actuators having working fluid chambers are provided. Each actuator is adapted to increase and decrease vehicle height as the results of the supply and the discharge of working fluid to and from its working fluid chamber, respectively. Working fluid supply passages supply working fluid at supply pressure to the working fluid chambers and working fluid discharge passages discharge working fluid from the working fluid chambers. Cut-off valves and pressure control devices are provided in the supply passages and the discharge passages. Each cut-off valve is adapted to remain in its closed position whenever the supply pressure is not more than a predetermined value. Each pressure control device is adapted to control the supply of the working fluid to and the discharge from the associated working fluid chamber to adjust the pressure within the chamber. The system further comprises devices for detecting the pressures within the working fluid chambers and a device for determining the supply pressure. The pressure control devices are controlled so that their controlling pressures may substantially be equal to the pressures within the associated working fluid chambers determined by the pressure determining devices at least until the cut-off valves are opened.

10 Claims, 32 Drawing Sheets

FIG. 20C

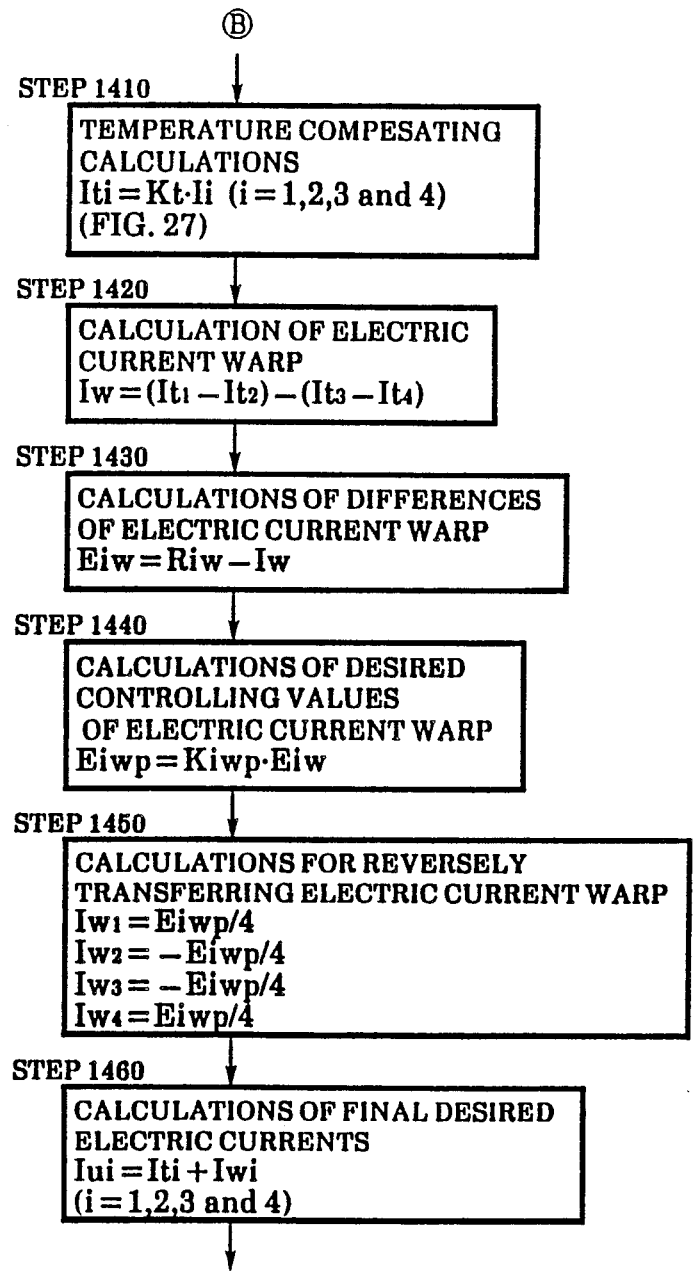

Ⓑ

STEP 1410
TEMPERATURE COMPESATING CALCULATIONS
$Iti = Kt \cdot Ii$  (i = 1, 2, 3 and 4)
(FIG. 27)

STEP 1420
CALCULATION OF ELECTRIC CURRENT WARP
$Iw = (It_1 - It_2) - (It_3 - It_4)$

STEP 1430
CALCULATIONS OF DIFFERENCES OF ELECTRIC CURRENT WARP
$Eiw = Riw - Iw$

STEP 1440
CALCULATIONS OF DESIRED CONTROLLING VALUES OF ELECTRIC CURRENT WARP
$Eiwp = Kiwp \cdot Eiw$

STEP 1450
CALCULATIONS FOR REVERSELY TRANSFERRING ELECTRIC CURRENT WARP
$Iw_1 = Eiwp/4$
$Iw_2 = -Eiwp/4$
$Iw_3 = -Eiwp/4$
$Iw_4 = Eiwp/4$

STEP 1460
CALCULATIONS OF FINAL DESIRED ELECTRIC CURRENTS
$Iui = Iti + Iwi$
(i = 1, 2, 3 and 4)

FIG. 34D

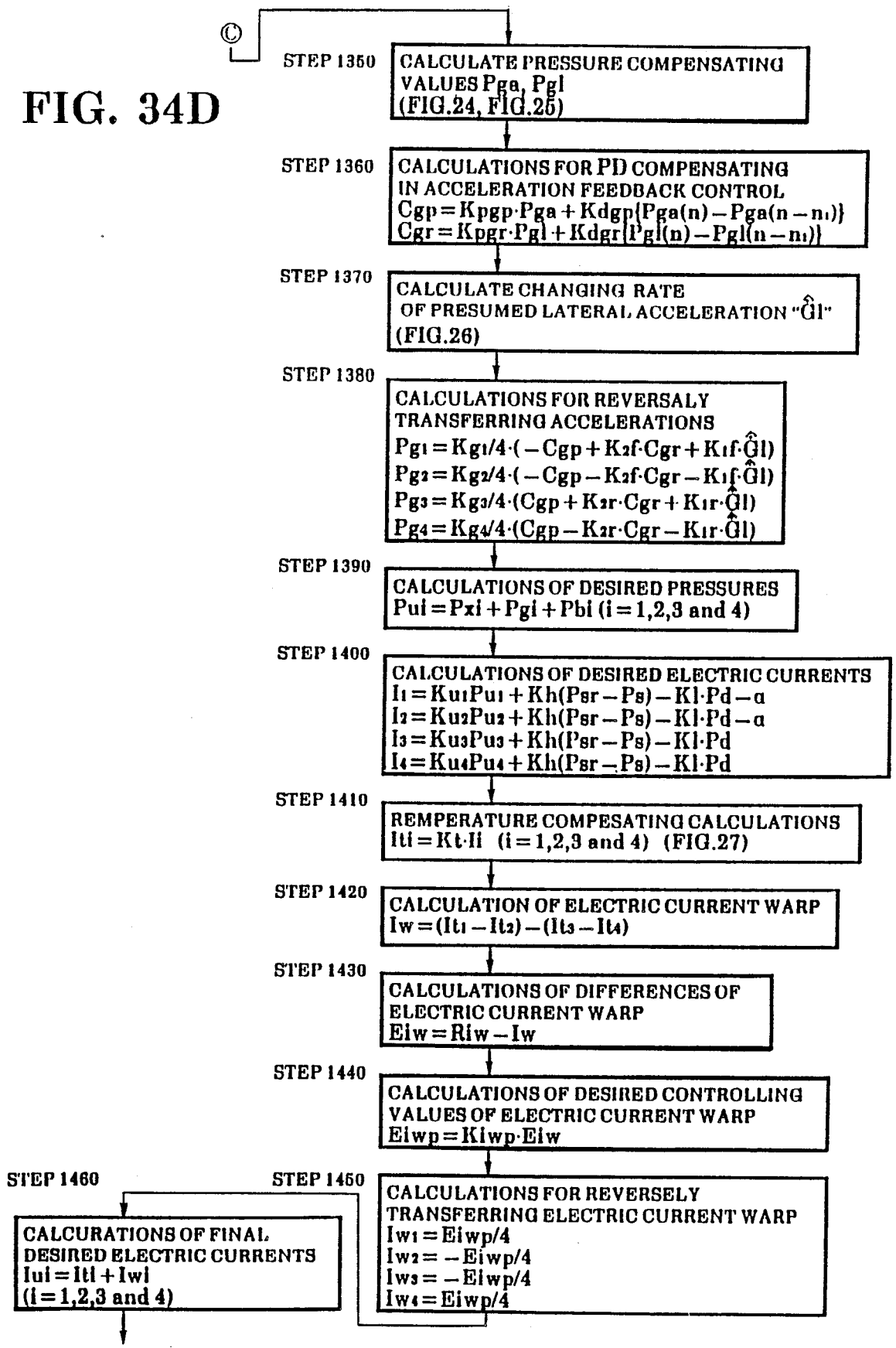

STEP 1350 — CALCULATE PRESSURE COMPENSATING VALUES $Pga$, $Pgl$ (FIG.24, FIG.25)

STEP 1360 — CALCULATIONS FOR PD COMPENSATING IN ACCELERATION FEEDBACK CONTROL
$Cgp = Kpgp \cdot Pga + Kdgp\{Pga(n) - Pga(n - n_1)\}$
$Cgr = Kpgr \cdot Pgl + Kdgr\{Pgl(n) - Pgl(n - n_1)\}$

STEP 1370 — CALCULATE CHANGING RATE OF PRESUMED LATERAL ACCELERATION "$\hat{Gl}$" (FIG.26)

STEP 1380 — CALCULATIONS FOR REVERSALY TRANSFERRING ACCELERATIONS
$Pg_1 = Kg_1/4 \cdot (-Cgp + K_{2f} \cdot Cgr + K_{1f} \cdot \hat{Gl})$
$Pg_2 = Kg_2/4 \cdot (-Cgp - K_{2f} \cdot Cgr - K_{1f} \cdot \hat{Gl})$
$Pg_3 = Kg_3/4 \cdot (Cgp + K_{2r} \cdot Cgr + K_{1r} \cdot \hat{Gl})$
$Pg_4 = Kg_4/4 \cdot (Cgp - K_{2r} \cdot Cgr - K_{1r} \cdot \hat{Gl})$

STEP 1390 — CALCULATIONS OF DESIRED PRESSURES
$Pui = Pxi + Pgi + Pbi$ ($i = 1,2,3$ and $4$)

STEP 1400 — CALCULATIONS OF DESIRED ELECTRIC CURRENTS
$I_1 = Ku_1 Pu_1 + Kh(Psr - Ps) - Kl \cdot Pd - \alpha$
$I_2 = Ku_2 Pu_2 + Kh(Psr - Ps) - Kl \cdot Pd - \alpha$
$I_3 = Ku_3 Pu_3 + Kh(Psr - Ps) - Kl \cdot Pd$
$I_4 = Ku_4 Pu_4 + Kh(Psr - Ps) - Kl \cdot Pd$

STEP 1410 — REMPERATURE COMPESATING CALCULATIONS
$Iti = Kt \cdot Ii$ ($i = 1,2,3$ and $4$) (FIG.27)

STEP 1420 — CALCULATION OF ELECTRIC CURRENT WARP
$Iw = (It_1 - It_2) - (It_3 - It_4)$

STEP 1430 — CALCULATIONS OF DIFFERENCES OF ELECTRIC CURRENT WARP
$Eiw = Riw - Iw$

STEP 1440 — CALCULATIONS OF DESIRED CONTROLLING VALUES OF ELECTRIC CURRENT WARP
$Eiwp = Kiwp \cdot Eiw$

STEP 1450 — CALCULATIONS FOR REVERSELY TRANSFERRING ELECTRIC CURRENT WARP
$Iw_1 = Eiwp/4$
$Iw_2 = -Eiwp/4$
$Iw_3 = -Eiwp/4$
$Iw_4 = Eiwp/4$

STEP 1460 — CALCURATIONS OF FINAL DESIRED ELECTRIC CURRENTS
$Iui = Iti + Iwi$ ($i = 1,2,3$ and $4$)

HYDRAULIC SUSPENSION SYSTEM FOR A VEHICLE WITH LESS ABRUPT CHANGE IN VEHICLE HEIGHT WHEN STARTED

BACKGROUND OF THE INVENTION

1. Field of the Invention

The present invention relates to a hydraulic suspension system for a vehicle such as an automobile or the like, and more particularly relates to an improved hydraulic suspension system in which an abrupt change in vehicle height is prevented when the system is started.

2. Prior Art

Conventional hydraulic suspension systems or vehicle height control systems for vehicles have, in general, a plurality of hydropneumatic actuators each being provided corresponding to vehicle wheels and adapted to increase and decrease the vehicle height as respective results of the supply and the discharge of working fluid to and from its working fluid chamber, working fluid supply passages for supplying working fluid to the working fluid chambers, working fluid discharge passages for discharging working fluid from the fluid chambers, connecting passages communicated with the working fluid chambers, and control valves each being adapted to selectively connect the associated connecting passage with the working fluid supply passage or the working fluid discharge passage so as to control the supply and the discharge of the working fluid to and from the working fluid chambers.

As described, for example, in Japanese Utility Model Laying Open Publication No. 62-202404 (1987) and Japanese Patent Laying Open Publication No. 63-106132 (1988), in such conventional hydraulic suspension systems or vehicle height control systems, it has already been known in the art to incorporate an on-off valve in each connecting passage so as to prevent the vehicle height from decreasing due to the undesirable phenomena that some of the working fluid flows out of the working fluid chamber during such a period when a pump is not operated which serves to supply high pressure working fluid to the working fluid supply passage or in such an event where any trouble has happened in the working fluid discharge passages or the like. The on-off valves are kept in their closed positions while the system is not operated and are opened when the vehicle height is adjusted or while the system is operated.

In the hydraulic suspension systems or vehicle height control systems having such on-off valves incorporated, the undesired decrease in vehicle height is effectively prevented. In such systems, however, if the on-off valves are opened under the condition where relatively large pressure differences exist across them when the system is started, a relatively large volume of working fluid will flow through each on-off valve at the instant when it is opened, which causes temporarily to change the vehicle height abruptly so that passengers might feel queer.

The problem is specifically more noticeable in the system wherein, as shown in FIGS. 8 and 9 in Japanese Patent Application No. Showa 63-284278 which was filed by an applicant the same as one of the assignees of the present application and which it is not intended hereby to admit as prior art to the present application except to the extent in any case required by applicable law, the control valves are pressure control valves each being adapted to regulate the pressure within the associated working fluid chamber and the on-off valves are cut-off valves each being adapted to respond to the pressure within the associated working fluid supply passage upstream of the pressure control valve and to remain in its closed position whenever the pressure is not more than a predeterminate value. Namely, in the last mentioned systems, since the pressure within the working fluid supply passage upstream of the pressure control valve increases from a level which is lower than the predeterminate value when the system is started to operate and each cut-off valve opens when the pressure within the supply passage has exceeded the predeterminate value, we can not accurately know when the cut-off valve opens, and therefore can not know the controlling pressure of the pressure control valve to be set at the time point when the associated cut-off valve opens.

As is also shown in FIG. 7, in the above mentioned Japanese Patent Application No. Showa 63-284278 the on-off valves may be cut-off valves which are provided on the opposite side from the associated actuator relative to the pressure control valve and are adapted to remain in their closed positions whenever the pressures within the associated working fluid supply passages upstream of the cut-off valves are not more than a predeterminate value. In such a system, although no problem will occur during the period before the cut-off valves open even if the instructed controlling pressures of the pressure control valves are zero or far different from the actual pressures within the working fluid chambers, the pressure control valves will act when the on-off valves have been opened so that working fluid flows relatively rapidly through the pressure control valves, causing a temporary abrupt change in vehicle height.

SUMMARY OF THE INVENTION

The present invention takes into consideration the problems in the above described conventional or the previously proposed hydraulic suspension systems or vehicle height control systems having the on-off valves or cut-off valves incorporated for preventing undesirable flow of working fluid, and it has as its principal object the provision of an improved hydraulic suspension system which is capable of preventing a temporary rapid change in vehicle height from occurring when the cut-off valves are opened and preventing passengers from feeling queer due to the abrupt change in vehicle height.

In the hydraulic suspension system wherein each pressure control means is so controlled, as described in detail later, that its controlling pressure may substantially be equal to the pressure within the associated working fluid chamber so as to avoid the abrupt change in vehicle height in the initial stage when the system is started, depending upon the conditions of a road surface and the load condition the controlling pressures of the pressure control means may produce what is called a pressure warp wherein the ratio between the controlling pressures for the front vehicle wheels is far different from that between the controlling pressures for the rear vehicle wheels. If an active control is carried out in which the pressure control means are actively controlled according to the running conditions of the vehicle and a pressure warp, if any, is eliminated or reduced to a lower lever, under the condition where a certain pressure warp exists, then the pressures within the working fluid chambers are abruptly changed at the instant when the active control is started, so that a shock on the vehicle body is generated due to the abrupt change in pressure.

Therefore, it is another object of the present invention to provide an improved hydraulic suspension system for a vehicle wherein the shock on the vehicle body is not generated when the active control on the pressure control means is initiated under the condition where a certain pressure warp exists.

Similarly, in the hydraulic suspension system wherein each pressure control means is so controlled that its controlling pressure may substantially be equal to the pressures within the associated working fluid chamber in the initial stage when the system is started, if the active control on the pressure control means in initiated which is based upon the feed back control of the vehicle heights so that their controlling pressures may be the desired values determined according to the running conditions of the vehicle and the desired pressures are relatively far different from the pressures within the working fluid chambers at that time, then the pressures within the working fluid chambers are abruptly changed at the instant when the active control is started, so that a shock on the vehicle body is again generated due to the abrupt change in pressure.

It is therefore yet another object of the present invention to provide an improved hydraulic suspension system for a vehicle wherein the shock on the vehicle body is not generated when the active control on the pressure control means based upon the feedback control of the vehicle heights is initiated.

Furthermore, in the hydraulic suspension system having means such as pressure sensors for determining the pressures within the working fluid chambers, if any fault such as open or short occurs in electric circuits in any of the pressure determining means, then that means can not correctly determine the pressure within the associated working fluid chamber and will provide an value which is different from the actual pressure. Therefore if such a fault occurs, a shock on vehicle body is caused due to the fact that the associated pressure control means is so controlled that its controlling pressure may be a level far different from the actual pressure within the associated working fluid chamber, and, accordingly, the pressure within that chamber is abruptly changed when the associated cut-off valve is opened.

Therefore, it is further yet another object of the present invention to provide an improved hydraulic suspension system wherein the shock on the vehicle body is prevented from occurring due to the occurrence of a fault in the pressure determining means.

The above mentioned principal object is accomplished, according to the present invention, by a hydraulic suspension system for a vehicle, comprising:

a plurality of hydropneumatic actuators each being adapted to increase and decrease the vehicle height as respective results of the supply and the discharge of working fluid to and from its working fluid chamber;

working fluid supply passage means for supplying working fluid at supply pressure to said working fluid chambers;

working fluid discharge passage means for discharging working fluid from said working fluid chambers;

cut-off valves each being provided in said working fluid supply passage means and said working fluid discharge passage means and being adapted to respond to said supply pressure and to remain in its closed position whenever said supply pressure is not more than a first predeterminate value;

pressure control means each being provided in said supply passage means and said discharge passage means and being adapted to control the supply and the discharge of the working fluid to and from said working fluid chamber to regulate the pressure within said chamber;

a first control means for controlling said pressure control means;

means for determining the pressures within said working fluid chambers; and a means for detecting the supply pressure;

wherein said first control means is so adapted that its instructing pressures for said pressure control means may substantially be equal to the pressures within the associated working fluid chambers determined by said pressure determining means at least until said supply pressure reaches a second predeterminate pressure which is equal to or higher than said first predeterminate value.

According to the present invention, the control means is so adapted that its instructing pressures for the pressure control means may substantially be equal to the pressures within the associated working fluid chambers determined by the pressure determining means at least until the supply pressure exceeds the second predeterminate pressure, and, accordingly, the pressure control means are controlled so that the controlling pressures thereof may substantially be equal to the actual pressures within the working fluid chambers. Therefore, in the system wherein each cut-off valve is provided between the associated pressure control means and the actuator, since the pressures on both sides of the cut-off valve in the passages are rendered to be substantially equal to each other so as to avoid a great pressure difference from being generated across the cut-off valve, a temporary rapid variation in vehicle height can positively be prevented from occurring due to the undesirable phenomena that a relatively large volume of working fluid flows through the cut-off valve at the stage when the the cut-off valve opens in response to the supply pressure which has been increased to a level equal to or higher than the second predeterminate value.

In the system wherein each cut-off valve is provided on the opposite side from the associated actuator relative to the pressure control means, although the pressure control means in fact can not serve to control the pressures of the working fluid until the associated cut-off valves open, they start controlling the pressures when the associated cut-off valves open so that their controlling pressures are adjusted to the levels which are substantially equal to the actual pressures within the working fluid chambers. Therefore, a temporary abrupt change in vehicle height can positively be prevented from occurring due to the undesirable phenomena that a relatively large volume of the working fluid flows through the pressure control valves when the associated cut-off valves are opened.

In accordance with to an embodiment of the present invention, the pressure determining means are pressure detecting means adapted to detect the pressures within the associated working fluid chambers.

In accordance with another embodiment of the present invention, the pressure determining means include vehicle height detecting means for detecting the vehicle heights at the locations corresponding to the actuators and are adapted to presume the pressures within the working fluid chambers according to the vehicle heights detected by the vehicle height detecting means.

In accordance with to yet another embodiment of the present invention, the system further comprises means for determining the running conditions of the vehicle, a second control means which is adapted gradually to reduce the pressure warp, if any, among the pressures within the working fluid chambers substantially to zero after the control by the first control means has been completed, and a third control means which is adapted to control the pressure control means according to the running conditions of the vehicle after the control by the second control means has been completed.

According to this embodiment, since the pressure control means are controlled by the second control means so that the pressures within the actuators may gradually be changed to the desired values at which the pressure warp is substantially zero, and the control on the pressure control means by the third control means according to the running conditions is initiated with the pressure warp having been controlled substantially to zero, the shock on the vehicle body can be prevented from occurring when the control for reducing the pressure warp is effected by the second control means.

Further, since the control by the second control means for reducing the pressure warp substantially to zero is so conducted that the pressures within the actuators may gradually be changed, the shock on the vehicle body can be prevented from occurring when the pressure warp is reduced by the second control means.

In accordance with to yet another embodiment of the present invention, the system further comprises means for determining the running conditions of the vehicle and vehicle height detecting means for detecting the vehicle heights at the locations corresponding to the actuators. The first control means is additionally adapted to control the pressure control means by the feedback control based upon the vehicle heights detected by the vehicle height detecting means so that their controlling pressures may be desired pressures after the supply pressure has exceeded the second predeterminate value. The desired pressures are gradually changed from the values which are substantially equal to the pressures within the working fluid chambers before the supply pressure exceeds the second predeterminate value to the values determined by the running conditions of the vehicle.

According to this embodiment, at least until the supply pressure exceeds the second predeterminate level, the pressure control means are so controlled that the controlling pressures thereof may substantially be equal to the pressures within the working fluid chambers in the corresponding actuators, and after the supply pressure has exceeded the second predeterminate level, the pressure control means are controlled by the feedback control based upon the vehicle heights detected by the vehicle height detecting means so that the controlling pressures may be their desired pressures, which are gradually changed from the values that are substantially equal to the pressures within the associated working fluid chambers before the supply pressure exceeds the second predeterminate level to the values that are determined according to the running conditions of the vehicle by the active control. Therefore, when the active control is started after the controlling pressures of the pressure control means have been controlled to "standby" pressures which are substantially equal to the pressures within the working fluid chambers in the actuators, the pressures within the fluid chambers are controlled so as gradually to change from the standby pressures to their desired pressures determined according to the running conditions of the vehicle so that the vehicle body can positively be prevented from changing its attitude when the active control is started.

In accordance with yet another embodiment of the present invention, the pressure determining means are pressure detecting means; the system further comprises means for detecting any fault in the pressure detecting means; and the first control means is adapted to presume the pressure in the working fluid chamber to be detected by an abnormal pressure detecting means, if any, based upon the pressures in the other fluid chambers detected by the normal pressure detecting means and to control the pressure control means corresponding to the abnormal pressure detecting means so that its controlling pressure may be substantially be equal to the presumed pressure.

According to this embodiment, even, if any fault may occur in any of the pressure detecting means, it is detected by the means for detecting any fault in the pressure detecting means; the pressure within the working fluid chamber which is to be detected by the abnormal pressure detecting means is presumed based upon the values detected by the normal pressure detecting means; and the pressure control means corresponding to the abnormal pressure detecting means is controlled so that the controlling pressure thereof may substantially be equal to the presumed value. Therefore, the cut-off valves can be prevented from opening with a larger pressure difference existing thereacross and the shock on the vehicle body which might otherwise occur due to the pressure difference when the out-off valves are opened can be prevented.

The present invention is now described in terms of preferred embodiments with reference to the attached drawings.

BRIEF DESCRIPTION OF THE DRAWINGS

In the accompanying drawings:

FIGS. 20A through 20C are flow charts showing the subroutine of the calculations for the active control;

FIGS. 34A through 34D are flow charts showing the subroutine of the calculations for the active control carried out in the fifth preferred embodiment of the hydraulic suspension system;

It is to be noted that corresponding parts are indicated by corresponding reference numerals throughout the diagrams of the drawings and corresponding steps are indicated by corresponding step numbers throughout the flow charts shown in the drawings.

DESCRIPTION OF THE PREFERRED EMBODIMENTS

The first preferred embodiment

Figure 1:
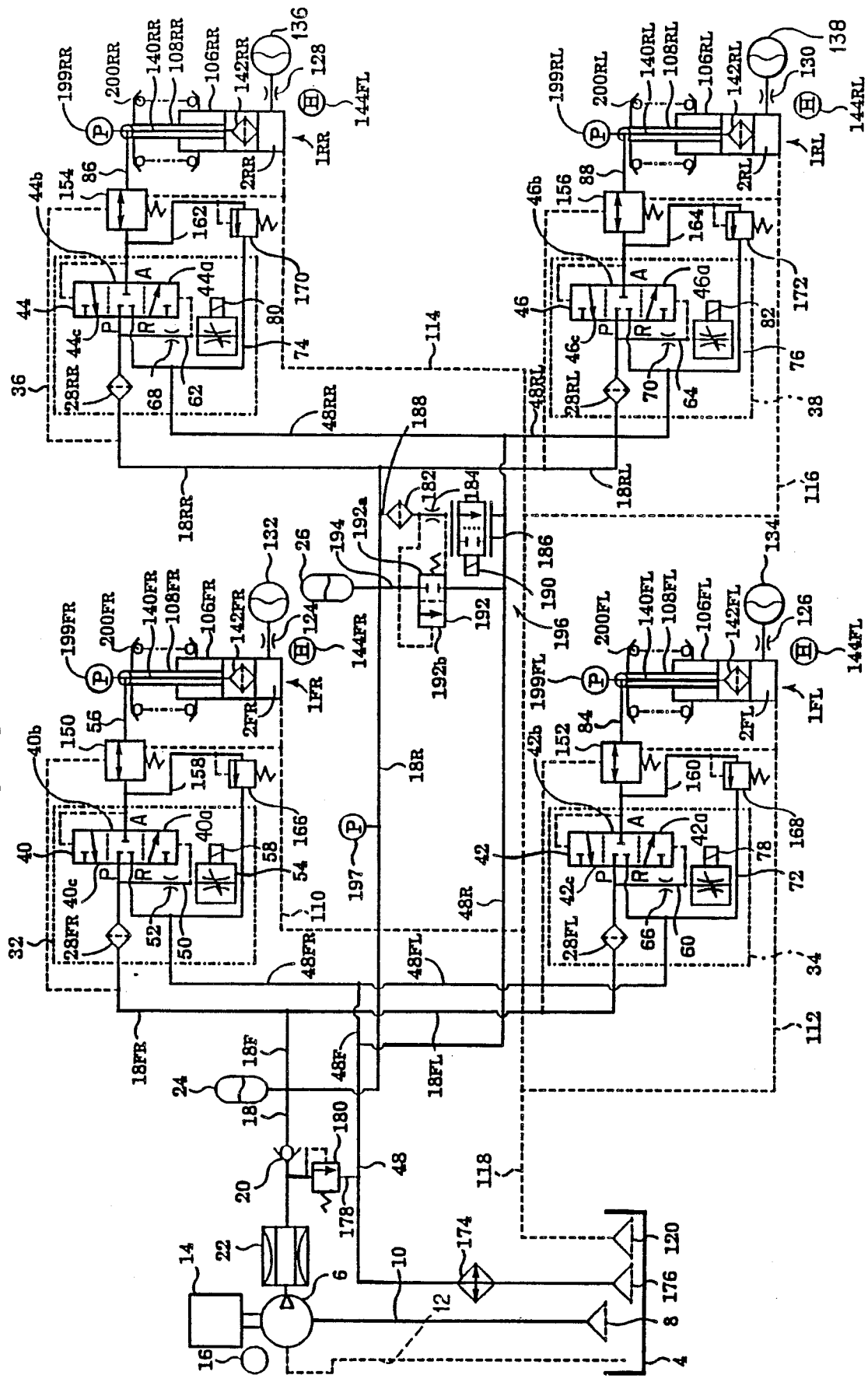
FIG. 1 is a schematic diagram showing major physical components of the first preferred embodiment of the hydraulic suspension system for a vehicle according to the present invention.

Referring to the drawings, FIG. 1 is a schematic diagram showing major physical components of the first preferred embodiment of the hydraulic suspension system of the present invention. The suspension system shown in FIG. 1 includes actuators 1FR, 1FL, 1RR and 1RL provided corresponding to front right, front left, rear right and rear left vehicle wheels, not shown, respectively, and these actuators have therein working fluid chambers 2FR, 2FL, 2RR, and 2RL, respectively.

In the figure, 4 designates a reserve tank which contains oil serving as working fluid, and the tank 4 is fluidly connected to the suction side of a pump 6 by a suction flow line 10 having therein a filter 8 for removing any foreign matter from oil. To the pump 6 is connected a drain line 12 which collects the oil leaking within the pump and returns it to the reserve tank 4. The pump 6 is drivingly connected with and rotationally driven by an engine 14, the rotational speed of which is detected by a rotational speed sensor 16.

A high pressure flow line 18 is connected with the discharge side of the pump 6. A check valve 20 is incorporated in the high pressure flow line 18, which permits only the flow of oil in the direction from the pump towards the actuators, and between the pump 6 and the check valve 20 is provided an attenuator 22 which serves to absorb or dampen the pressure pulsation of the oil discharged from the pump, thereby reducing the pressure variation. The high pressure flow line 18 is connected with one ends of a high pressure flow line 18F for the front vehicle wheels and a high pressure flow line 18R for the rear vehicle wheels, with which are connected accumulators 24 and 26, respectively. These accumulators contain therein pressurized gas and serve to absorb pressure variation of the oil and to accumulate pressure. A high pressure flow line 18FR for the front right vehicle wheel and a high pressure flow line 18FL for the front left vehicle wheel are connected at their one ends with the high pressure flow line 18F, while a high pressure flow line 18RR for the rear right vehicle wheel and a high pressure flow line 18RL for the rear left vehicle wheel are connected at their one ends with the high pressure flow line 18R. The high pressure flow lines 18FR, 18FL, 18RR and 18RL have therein filters 28FR, 28FL, 28RR and 28RL, respectively, and lines are connected at their other ends with ports P of pilot-operated three-port switching control valves 40, 42, 44 and 46 included in pressure control valves 32, 34, 36 and 38, respectively.

The pressure control valve 32 comprises the switching control valve 40, a flow line 50 fluidly communicating the high pressure flow line 18FR and a low pressure flow line 48FR for the front right vehicle wheel with each other a fixed flow restriction 52 and a variable flow restriction 54 both provided in the flow line 50. The switching control valve 40 has, in addition to the port P, ports R and A which are connected with low pressure flow line 48FR and a connecting flow line 56, respectively. The switching control valve 40 may be a spool type valve adapted to take in as pilot pressures the pressure Pp within the flow line 50 between the flow restrictions 52 and 54 and the pressure Pa within the connecting flow line 56, and to be shifted to a switching position 40a where in it fluidly communicates the ports P and A with each other when the pressure Pp is substantially higher than the pressure Pa; a switching position 40b wherein it cuts the communication among the all the ports when the pressure Pp and Pa are substantially equal to each other; and a shifting position 40c wherein it fluidly communicates the ports R and A with each other when the pressure Pp is substantially lower than the pressure Pa. The variable flow restriction 54 is adapted to vary its effective flow area by means of the electric current supplied to its solenoid 58 being controlled and to cooperate with the fixed flow restriction 52 to variably control the pilot pressure Pp.

Similarly, the pressure control valves 34, 36 and 38 comprise pilot-operated, three-port switching control valves 42, 44 and 46 corresponding to the valve 40, flow lines 60, 62 and 64 corresponding to the flow line 50, fixed flow restrictions 66, 68 and 70 corresponding to the flow restriction 52, and variable flow restriction 72, 74 and 76 corresponding to the flow restriction 54, respectively. The variable flow restrictions 72, 74 and 76 have solenoids 78, 80 and 82, respectively, corresponding to the solenoid 58.

The switching control valves 42, 44 and 46 have the same construction as the switching valve 40, and have the ports R connected with one ends of a low pressure flow line 48FL for front left vehicle wheel, a low pressure flow line 48RR for rear right vehicle wheel, and a low pressure flow line 48Rl for rear left vehicle wheel, respectively, and the ports A connected with one ends of connecting flow lines 84, 86 and 88, respectively. The switching valves 42, 44 and 46 are spool type valves adapted to take in as pilot pressures the pressures Pp within the associated flow lines 60, 62 and 64 between the associated fixed and the variable flow restrictions and the pressures Pa within the associated flow lines 84, 86 and 88, and to be shifted to switching positions 42a, 44a and 46a, respectively, wherein they fluidly communicate the ports P and A with each other when the pressures Pp are substantially higher than the pressure Pa; shifting positions 42b, 44b and 46b wherein they shut the communications among the all the ports when the pressures Pp and Pa are substantially equal to each other; and shifting positions 42c, 44c and 46c wherein they fluidly communicate the ports R and A with each other when the pressures Pp are substantially lower than the pressures Pa.

As is schematically shown in FIG. 1, the actuators 1FR, 1FL, 1RR and 1RL include cylinders 106FR, 106FL, 106RR and 106RL defining the working fluid chambers 2FR, 2FL, 2RR and 2RL and pistons 108FR, 108FL, 108RR and 108RL, respectively, which are reciprocally inserted into the associated cylinders. While in the embodiment shown, the actuators are located between a vehicle body, not shown, and associated suspension arms, also not shown with each cylinder being coupled to the associated suspension arm and the upper extremity of the rod portion of each piston being coupled to the vehicle body, each cylinder may be coupled to the vehicle body and each piston may be coupled the associated suspension arm. Drain flow lines 110, 112, 114 and 116 are fluidly connected at their one ends with the cylinders 106FR, 106FL, 106RR and 106RL, respectively, of the actuators. The other ends of the drain lines 110, 112, 114 and 116 are connected with a drain flow line 118, which is in turn connected with the reserve tank 4 by way of a filter 120 so that the oil leaking from the working fluid chambers may be returned into the tank.

To the working fluid chambers 2FR, 2FL, 2RR and 2RL are connected accumulators 132, 134, 136 and 138, respectively, serving as hydropneumatic springs by way of flow restrictions 124, 126, 138 and 130, respectively. The pistons 108FR, 108FL, 108RR and 108RL have therein flow lines 140FR, 140FL, 140RR and 140RL, respectively. These flow lines fluidly connect the associated flow lines 56, 84, 86 and 88 and the associated working fluid chambers 2FR, 2FL, 2RR and 2RL with each other, and have therein filters 142FR, 142FL, 142RR and 142RL, respectively. At the locations adjacent to the actuators 1FR, 1FL, 1RR and 1RL are installed vehicle height sensors 144FR, 144FL, 144RR and 144RL, respectively, each detecting the distance between the vehicle body and the associated vehicle wheel.

The connecting flow lines 56, 84, 86 and 88 have therein pilot-operated cut-off valves 150, 152, 154 and 156, respectively, which are adpated to retain their closed positions whenever the pressure differences between the pressures within the high pressure flow lines 18FR, 18FL, 18RR and 18RL upstream of the associated pressure control valves 40, 42, 44 and 46, respectively, and the pressures within the drain flow lines 110, 112, 114 and 116, respectively, are not more than predeterminate values, and to increase their opening degree with the increase in the pressure differences in the range where the differences exceed the predetermination values. The flow lines 56, 84, 86 and 88 are connected between the associated pressure control valves and the cut-off valves with the flow line 50, 60, 62 and 64 in the pressure control valves on the downstream side of the associated variable flow restrictions by flow lines 158, 160, 162 and 164, respectively. The flow lines 158, 160, 162 and 164 have therein relief valves 166, 168, 170 and 172, respectively, which are adapted to take in as pilot pressures the pressures within the associated flow lines 158, 160, 162 and 164, respectively, upstream thereof, i.e., on the side of the associated connecting flow lines, and to open when the pilot pressures exceed predeterminate values to thereby conduct some oil within the connecting flow lines to the flow lines 50, 60, 62 and 64.

The flow lines 48FR and 48FL are connected at their other ends with one end of a low pressure flow line 48F for the front vehicle wheels, while the flow lines 48RR and 48RL are connected at their other ends with one end of a low pressure flow line 48R for the rear vehicle wheels. The flow lines 48F and 48R are connected at their other ends with one end of a low pressure flow line 48. The flow line 48 has therein an oil cooler 174 and is connected at the other end with the reserve tank 4 by way of a filter 176. The high pressure flow line 18 is fluidly connected at a position between the check valve 20 and the attenuator 22 with the low pressure flow line 48 by a flow line 178. The flow line 178 has therein a relief valve 180 which is adapted to open when its pilot pressure is more than a predeterminate value.

The high pressure flow line 18R and the low pressure flow line 48R are connected with each other by a flow line 188 which has therein a filter 182, a flow restriction 184 and a normally open electromagnetic on-off valve 186 including a solenoid 190 for adjusting the valve opening. The on-off valve 186 is adapted to open when its solenoid 190 is energized and to control the flow rate of the oil flowing therethrough when the energizing electric current is adjusted. The high pressure flow line 18R and the low pressure flow line 48R are additionally connected with each other by a flow line 194 which have therein a pilot-operated on-off valve 192. The on-off valve 192 is adapted to take in as pilot pressures the pressures on both sides of the flow restriction 184 and to remain in its closed position 192a when no substantial pressure difference exists between the pressures on both sides of the flow restriction 184 and to be switched over to its open position 192b when the pressure on the side of the high pressure flow line 18R relative to the flow restriction 184 is substantially higher than the pressure on the side of the low pressure flow line. Thus, the flow restriction 184, the electromagnetic on-off valve 186 and the on-off valve 192 cooperate with each other to define a bypass valve 196 which selectively communicates the high pressure flow line 18R and the low pressure flow line 48R with each other, and controls the flow rate of the oil flowing from the high pressure flow line to the low pressure flow line.

Further in the first embodiment shown, a pressure sensor 197 is connected to the high pressure flow line 18R for detecting the oil pressure within the flow line and pressure sensors 199FR, 199RL, 199RR and 199RL are connected to the actuators 1FR, 1RL, 1RR and 1RL for detecting the oil pressure within the working fluid chambers 2FR, 2RL, 2RR and 2RL, respectively. Compression coil springs 200FR, 200RL, 200RR and 200RL serving as suspension spring are interposed between upper sheets attached to the rod portions of the pistons 108FR, 108RL, 108RR and 108RL incorporated in the actuators and lower sheets secured to the cylinders 106FR, 106RL, 106RR and 106RL, respectively.

Figure 2:
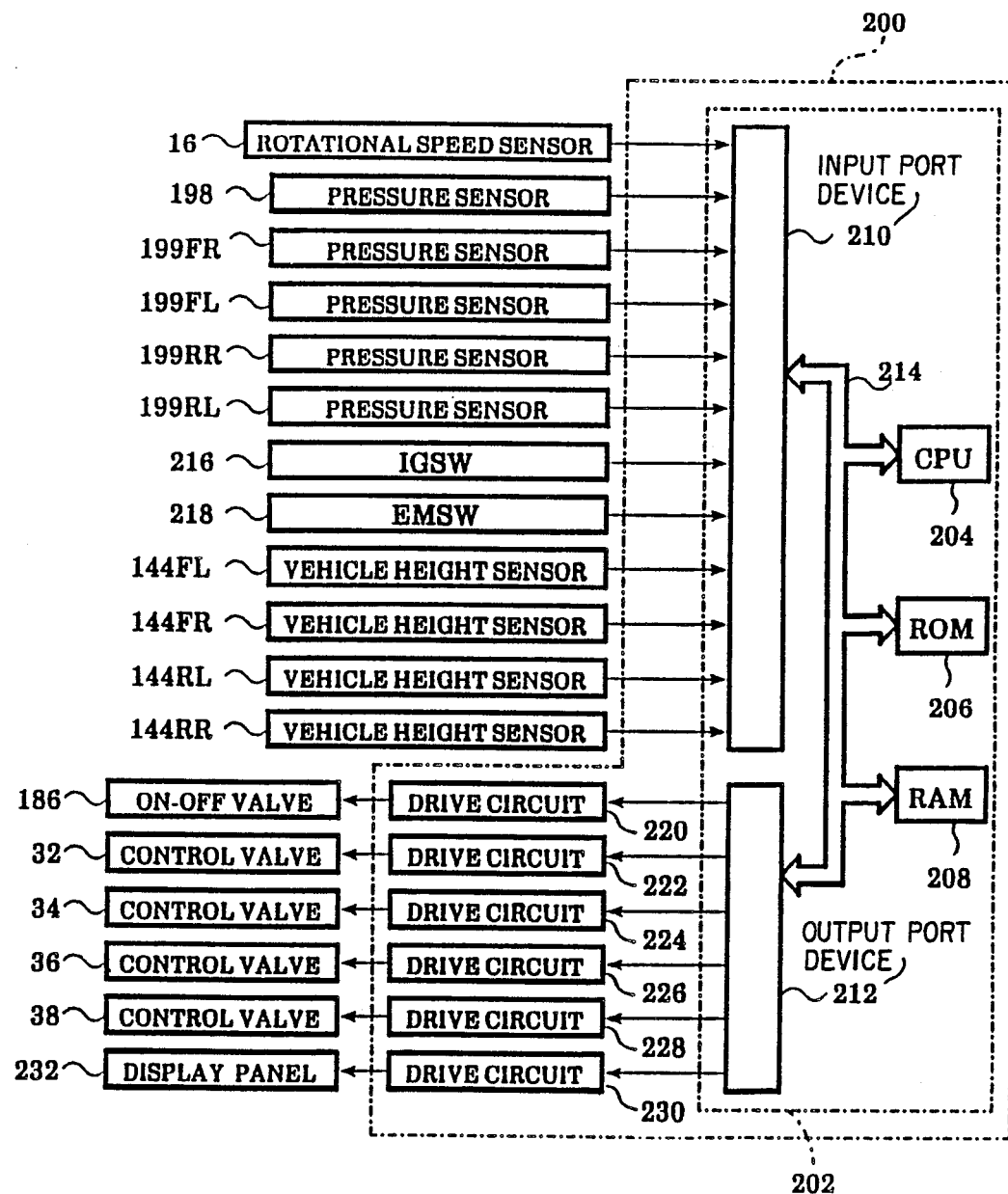
FIG. 2 is a block diagram showing an electric control device of the first,embodiment shown in FIG. 1.

The electromagnetic on-off valve 186 and the pressure control valves 32, 34, 36 and 38 are controlled by an electric control device 200 shown in FIG. 2. The electric control device 200 includes a microcomputer 202. The microcomputer 202 may, as shown in FIG. 2, be of conventional construction having a (CPU) central processing unit 204, a (ROM) read only memory 206, a (RAM) random access memory 208, an input port device 210, and an output port device 212, all of these being linked with each other by a two way common bus 214.

The input port device 210 is supplied with a signal indicative of the rotational speed of the engine 14 from the rotational speed sensor 16, a signal indicative of the pressure Ps within the high pressure flow line from the pressure sensor 198, signals indicative of the pressures Pi (where "i" is "1" for the front left wheel, "2" for the front right wheel, "3" for the rear left wheel, and "4" for the rear right wheel) within the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, a signal indicative of whether or not an emergency switch (EMSW) 218 is on which is provided in a cabin and is operated by a driver or a passenger, and signlas indicative of the vehicle heights Xi (i=1, 2, 3 and 4) at locations corresponding to the front left wheel, the front right wheel, the rear left wheel, and the rear right wheel from the vehicle height sensors 144FL, 144FR, 144RL and 144RR, respectively. The input port device 210 processes the signals input thereinto in a predetermined manner and, under the control of the CPU 204 which is based upon the program stored in the ROM 206, outputs the processed signals to the CPU and the RAM 208. The ROM 206 stores the control flow shown in FIG. 3 and the maps shown in FIGS. 4 through 7. The output port device 212, under the control of the CPU 204, outputs a control signal via drive circuit 220 to the electromagnetic on-off valve 186 and control signals via drive circuits 222, 224, 226 and 228 to the pressure control valves 32, 34, 36 and 38, to be more exact, to the solenoids 58, 78, 80 and 82 in the variable flow restrictions 54, 72, 74 and 76, respectively, and a control signals via a drive circuit 230 to a display panel 232.

Figure 3:
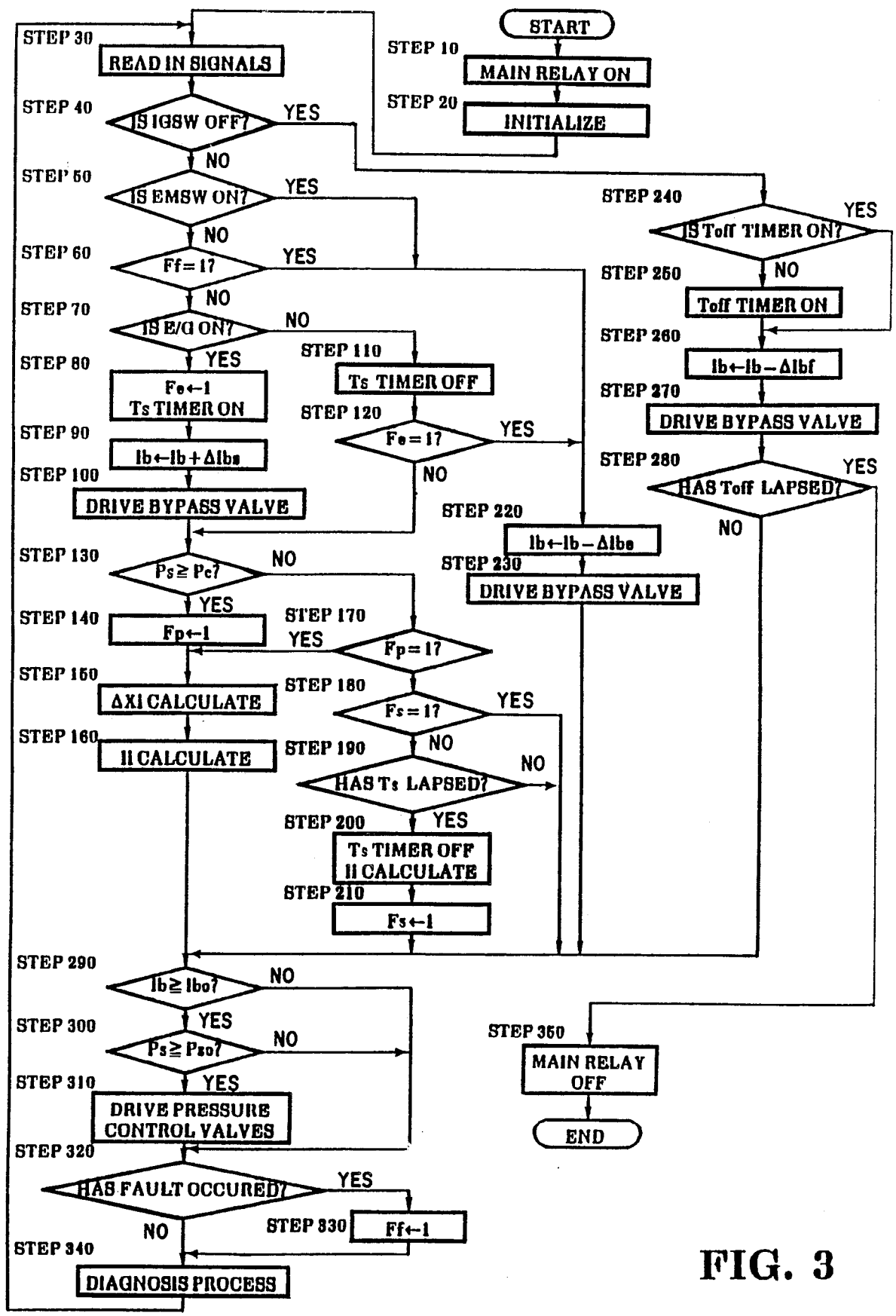
FIG. 3 is a flow chart showing a control flow of a cyclical program carried out by the electric control device shown in FIG. 2.

Referring now to the flow chart shown in FIG. 3, the operation of the first embodiment is explained.

In this connection, it is to be noted that the routine of the control flow shown in FIG. 3 is initiated when the ignition switch 216 is turned on. It should also be noted that in the flow chart shown in FIG. 3, a flag Ff concerns whether or not any fault or faults exist anywhere in the hydraulic suspenson system and one means that any fault or faults have occurred in the hydraulic suspension system; a flag Fe is concerned with whether or not the engine is running and one means that the engine is running; a flag Fp relates to whether or not the pressure Ps of the oil within the high pressure flow line has ever exceeded a threshold pressure Pc above which the cut-off valves 152, 150, 156 and 154 are completely closed and one means that the pressure Ps has ever exceeded the pressure Pc; and a flag Fs is related to whether or not standby pressures Pbi (i=1, 2, 3 and 4) referred to later have been set for the pressure control valves 34, 32, 38 and 36, and one means that the standby pressures have been set.

In the first step 10, a main relay not shown in the figures is turned on, and then the flow of control passes next to the step 20.

In the step 20, the RAM 208 is cleared of all the information stored therein and all the flags are reset to zero, and then the flow of control passes to the next step 30.

In the step 30, the signal indicative of the rotational speed Nr of the engine 14 detected by the rotational speed sensor 16, the signal indicative of the pressure Ps within the high pressure flow line detected by the pressure sensor 197, the signals indicative of the pressures Pi within the working fluid chambers 2FL, 2FR, 2RL and 2RR detected by the pressure sensors 199FL, 199FR, 199RL and 199RR, respectively, the signal indicative of whether or not the ignition switch 216 is on the signal indicative of whether or not the emergency switch 218 is on, the signals indicative of the vehicle heights Xi detected by the vehicle height sensors 144FL, 144FR, 144RL, and 144RR are read in, and then the flow of control proceeds to the next step 40.

In the step 40, a decision is made as to whether or not the ignition switch is off. If a decision is made that the ignition switch is off, then the flow of control is transferred to the step 240, ands if a decision is made that the ignition switch is on, then the flow of control passes next to the step 50.

In the step 50, a decision is made as to whether or not the emergency switch is on. If the a decision is made that the emergency switch is on, then the flow of control is transferred to the step 220, and if a decision is made that the emergency switch is not on, then the flow of control passes next to the step 60.

In the step 60, a decision is made as to whether or not the flag Ff is one. If a decision is made that the flag Ff is one, then the flow of control is transferred to the step 220, and if a decision is made that the flag Ff is not one, then the flow of control proceeds to the next step 70.

In the step 70, a decision is made as to whether or not the engine is running by determining whether or not the rotational speed Nr of the engine which was detected by the rotational speed sensor 16 and read in the step 30 is more than a predeterminate value. If a decision is made that the engine is not running, then the flow of control is transferred to the step 110, and if a decision is made that the engine is running, then the flow of control passes next to the step 80.

It is to be understood that the decision as to whether or not the engine is running may be made by, for example, determining whether or not the voltage of the electricity generated by an alternator, not shown, which is driven by the engine is higher than a predeterminate value.

In the step 80, the flag Fe is set to one, and a timer is started which counts the period of time Ts between the time point when the engine is started and the time point when the standby pressures Pbi are set for the pressure control valves 34, 32, 38 and 36 in the step 200 referred to later, and then the flow of control passes next to the step 90. In the event, however, where the flag Fe has already been set to one, it is left as it is, and in the case where the timer has already been operated, it continues to count.

Figure 4:
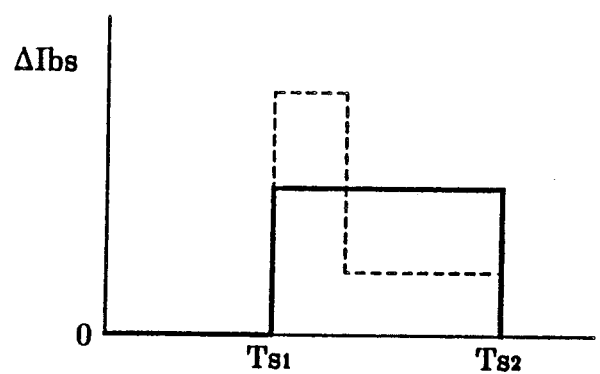
FIGS. 4 through 6 are graphs showing the maps utilized in calculating the electric current Ib which is supplied to the bypass valve at the stage when the hydraulic suspension system is started, when the suspension system is stopped under a normal operational condition, and when the system is stopped under an abnormal operational condition, respectively.

In the step 90, electric current Ib which is supplied to the solenoid 190 within the electromagnetic on-off valve 186 included in the bypass valve 196 is calculated according to the map which corresponds to the graph shown in FIG. 4 and is stored in ROM 206 and according to the following equation, and then the flow of control passes next to the step 100.

$$Ib = Ib + delta\ Ibs$$

In the step 100, the electric current Ib calculated in the step 90 is supplied to the solenoid 190 in the electromagnetic on-off valve 186 to shift the bypass valve 196 toward its fully closed position, and then the flow of control proceeds to the next step 130.

In the step 110, the Ts timer is stopped, and then the flow of control passes next to the step 120. In the event, however, where the Ts timer is not operated, it is left as it is.

In the step 120, a decision is made as to whether or not the flag Fe is one. If a decision is made that the flag Fe is one, i.e., the engine has been stopped after it was once started, then the flow of control is transferred to the step 220, and if a decision is made that the flag Fe is not one, i.e., the engine has not yet been started, then the flow of control passes next to the step 130.

In the step 130, a decision is made as to whether or not the pressure Ps within the high pressure flow line is equal to or more than the threshold value Pc. If a decision is made that Ps is not equal to or is not higher than Pc, then the flow of control is transferred to the step 170, and if a decision is made that Ps is equal to or higher than Pc, then the flow of control passes next to the step 140.

In the step 140, the flag Fp is set to one, and next the flow of control passes to the step 150.

In the step 150, based upon the differences between the vehicle heights Xi at the locations corresponding to the vehicle wheels which are read in the step 30 and the reference vehicle heights Xoi, the adjusting quantities delta Xi for the vehicle heights at the locations corresponding to the vehicle wheels are calculated according the following equations, and then the flow of control passes next to the step 160.

$$delta\ Xi = Xi - Xoi$$

In this connection, it should be understood that the method or the manner for calculating of the vehicle height adjusting quantities delta Xi per se does not form a part of the present invention, and accordingly the adjusting quantities may be calculated in any desired manner.

In the step 160, electric currents Ii are calculated which are supplied to the solenoids 78, 58, 82 and 80 incorporated within the variable flow restrictions 72, 54, 76 and 74 in the pressure control valves so as to adjust the vehicle heights by the adjusting quantities delta Xi calculated in the step 150, and the flow of control passes next to the step 290. The currents Ii may be in direct proportion to the quantities delta Xi.

In the step 170, a decision is made as to whether or not the flag Fp is one. If a decision is made that the flap Fp is one, i.e., the pressure Ps of the oil within the high pressure flow line has been decreased to a level lower than the threshold pressure Pc after it was increased to a level equal to or higher than the threshold value, then the flow of control passes to the step 150, and if a decision is made that the flap Fp is not one, i.e., the pressure Ps has not yet been increased to a level equal to or higher tahn the threshold pressure Pc, then the flow of control passes next to the step 180.

In the step 180, a decision is made as to whether or not the flap Fs is one. If a decision is made that the flag Fs is one, then the flow of control passes to the step 290, and if a decision is made that the flag Fs is not one, then the flow of control passes next to the step 190.

In the step 190, a decision is made as to whether or not the time Ts has elapsed. If a decision is made that the time Ts has not yet elapsed, then the flow of control passes to the step 290, and if a decision is made that the time Ts has elapsed, then the flow of control passes next to the step 200.

In the step 200, the Ts timer is stopped, and the values of the electric currents Ii (i=1, 2, 3 and 4) are calculated which are supplied to the solenoids 78, 58, 82 and 80 incorporated within the variable flow restrictions 72, 54, 76 and 74 in the pressure control valves 34, 32, 38 and 36 so that the pressures within the connecting flow lines 84, 56, 88 and 86 between the associated pressure control valves and the associated cut-off valves may be controlled to the respective standby pressures Pbi, i.e., the pressures which are substantially equal to the pressures Pi within the working fluid chambers 2FL, 2FR, 2RL and 2RR that are detected by the associated pressure sensors, and then the flow of control passes next to the step 210.

In the step 210, the flag Fs is set to one, and then the flow of control is transferred to the step 290.

Figure 6:
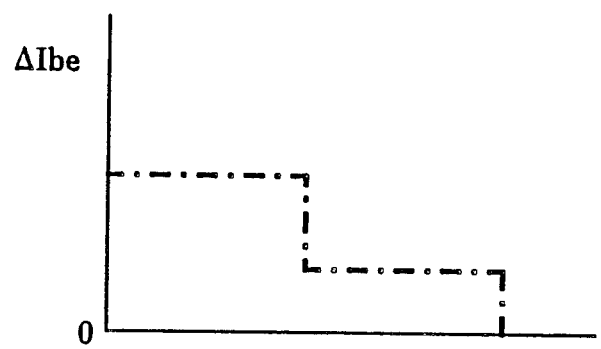

In the step 220, based upon the map which corresponds to the graph shown in FIG. 6 and is stored in the ROM 206, the electric current Ib which is supplied to the solenoid 190 incorporated within the electromagnetic on-off valve 186 included in the bypass valve 196 is calculated according to the following equation, and then the flow of control passes next to the step 230.

$$Ib = Ib - delta\ Ibe$$

In the step 230, the electric current Ib calculated in the step 220 is supplied to the solenoid 190 to shift the bypass valve 196 towards its full open position, and then the flow of control is transferred to the step 290.

Figure 8:
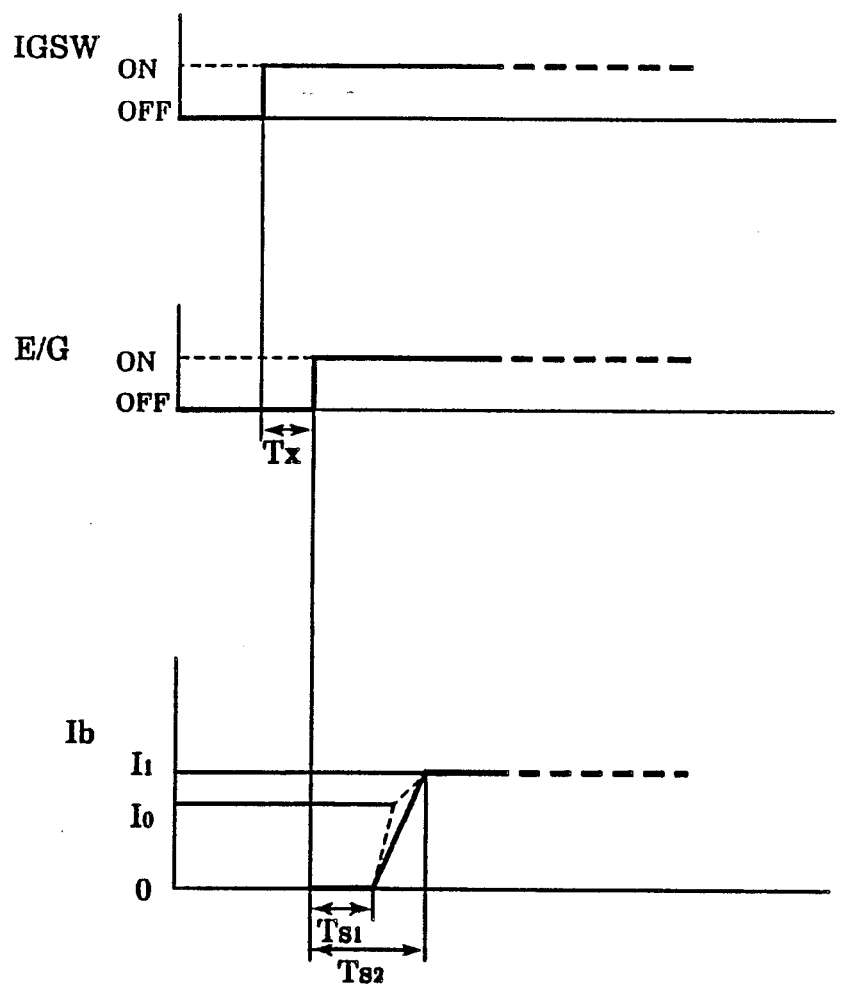
FIG. 8 is a time chart for illustrating the varying pattern of the electric current Ib at the initial stage when the hydraulic suspension system is started.

In the step 240, a decision is made as to whether or not a timer is on which concerns the period of time Toff, as shown in FIG. 8, between the time point when the ignition switch is turned off and the time point when the main relay is switched off. If a decision is made that the Toff timer is on, then the flow of control passes next to the step 260, and if a decision is made that the Toff timer is not on, then the flow of control passes next to the step 250.

In the step 250, the Toff timer is started to count, and then the flow of control passes next to the step 260.

Figure 5:
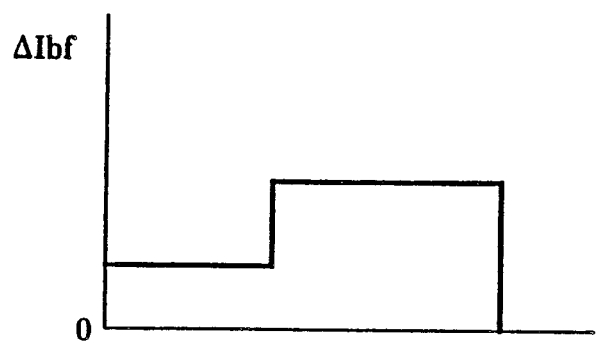

In the step 260, based upon the map which corresponds to the graph shown in FIG. 5 and is stored in the ROM 206, the electric current Ib which is supplied to the solenoid 190 incorporated in the electromagnetic on-off valve 186 is calculated according to the following equation, and then the flow of control proceeds to the next step 270.

$$Ib = Ib - delta\ Ibf$$

In the step 270, the electric current Ib calculated in the step 260 is supplied to the solenoid 190 in the electromagnetic on-off valve 186 to shift the bypass valve 196 towards its full open position, and then the flow of control passes next to the step 280.

In the step 280, a decision is made as to whether or not the time Toff has elapsed. If a decision is made that the time Toff has elapsed, then the flow of control is transferred to the step 350, and if a decision is made that the time Toff has not yet elapsed, then the flow of control passes to the next step 290.

In the step 290, a decision is made as to whether or not the electric current Ib calculated in the step 90, 220 or 260 is not less than a reference value Ibo. If a decision is made that the current Ib is less than Ibo, then the flow of control is transferred to the step 320, and if a decision is made that the current Ib is not less than Ibo, then the flow of control passes next to the step 300.

In the step 300, a decision is made as to whether or not the pressure Ps within the high pressure flow line read in the step 30 is not less than a reference value Pso which is lower than the threshold value Pc. If a decision is made that Ps is less than Pso, then the flow of control passes to the step 320, and if a decision is made that Ps is not less than Pso, then the flow of control passes next to the step 310.

In the step 310, the electric currents Ii calculated in the step 160 is supplied to the solenoid 78, 58, 82 and 80 incorporated in the variable flow restrictions included in the associated pressure control valves so that the valves are driven to adjust the pressures within the working fluid chambers in the associated actuators, and the flow of control proceeds to the next step 320.

In the step 320, a decision is made as to whether or not any fault or faulsts exist anywhere in the hydraulic suspension system. If a decision is made that no fault exists, then the flow of control passes to the step 340, and if a decision is made that an fault or faults exist, then the flow of control passes next to the step 330.

In the step 330, the fault-flag Ff is set to one, and then the flow of control proceeds to the next step 340.

In the step 340, a diagnosis process is effected with respect to the various parts in the hydraulic suspension system. If any trouble or troubles such as faults are found, then code numbers showing their positions are indicated on the display panel 232, and if no trouble is found, then the flow of control returns to the step 30 without indicating any code number on the display panel, and thereafter the steps 30 through 340 described above are repeated.

In the step 350, hte main relay is turned off to finish the control flow shown in FIG. 3 and to stop supplying electricity to the electric control device 200 shown in FIG. 2.

Thus in this first embodiment, when the hydraulic suspension system is started to operate, in the steps 40, 50 and 60 a decision is NO is made, and in the stage when the engine has not yet been started a decision of NO is made in the step 70.

As shown in FIG. 8, as the engine is started at the time point when a certain period of time Tx has elapsed after the ignition switch was turned on, in the step 70 a decision of YES is made; in the step 80 the Ts timer is started to count; and in the step 90 the electric current Ib is calculated according to the map which corresponds to the graph shown in FIG. 4. As depicted in FIGS. 4 and 8, the electric current Ib is zero in the period $Ts_1$ after the engine has been started and thereafter the electric current Ib is gradually increased over a period of time $(Ts_2 - Ts_1)$ to a value I1 which is high enough to close the bypass valve completely.

Figure 7:
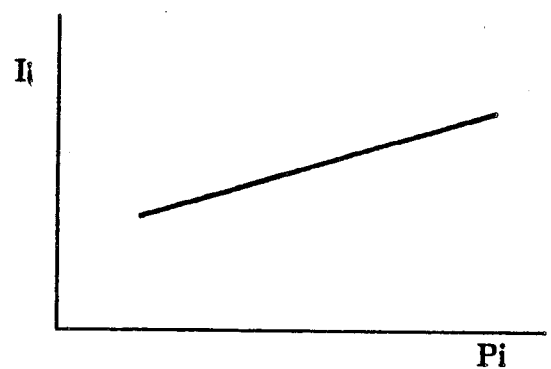
FIG. 7 is a graph showing the relationship between the pressures Pi within the working fluid chambers in the actuators and the electric currents Ii supplied to the pressure control valves.

When the time Ts has passed since the engine was started, in the step 190 a decision of YES is made; in the step 200 the control electric currents Ii supplied to the pressure control valves are calculated based upon the map corresponding to the graph shown in FIG. 7; and in the step 310 these control electric currents are supplied to the associated pressure control valves so that the controlling pressures of the pressure control valves, i.e., the pressures within the connecting flow lines between the pressure control valves and the associated cut-off valves are adjusted to the standby pressures Pbi which are substantially equal to the associated pressures Pi within the working fluid chambers detected by the associated pressure sensors.

The second preferred embodiment

Figure 10:
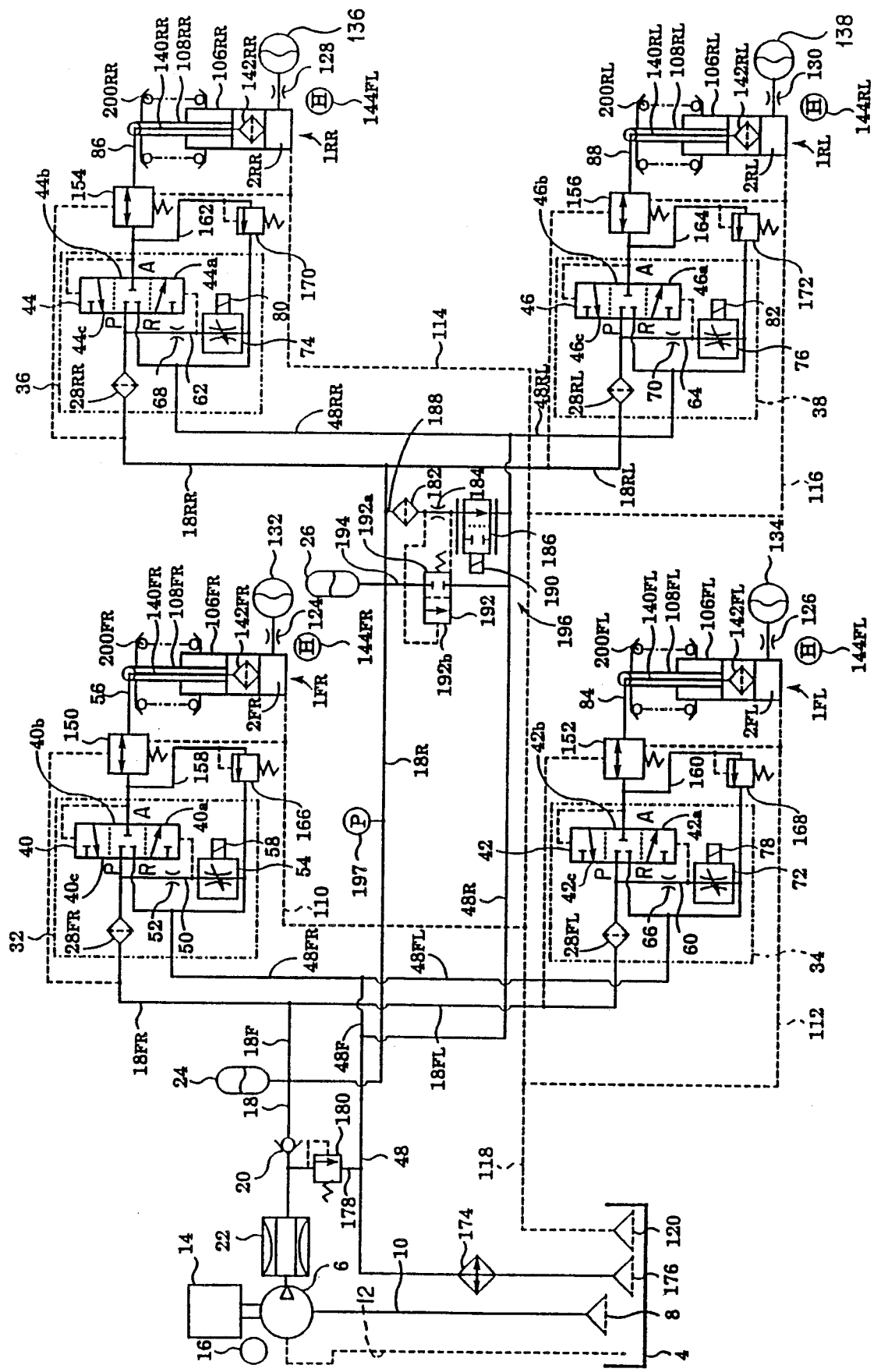
FIG. 10 is a schematic diagram, similar to FIG. 1, showing major physical components of the second preferred embodiment of the hydraulic suspension system according to the present invention.
Figure 11:
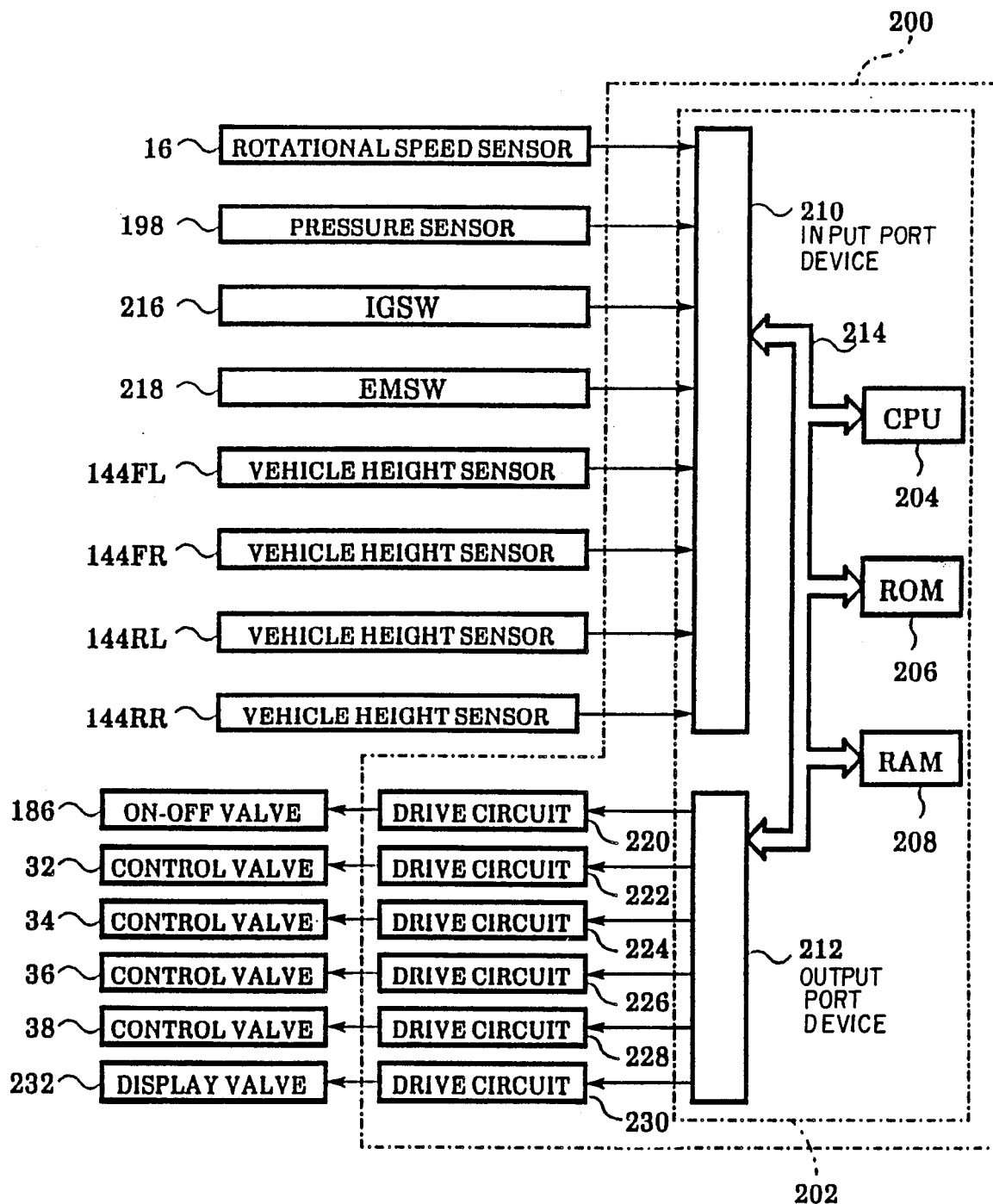
FIG. 11 is a block diagram, similar to FIG. 2, showing an electric control device of the second embodiment.
Figure 12:
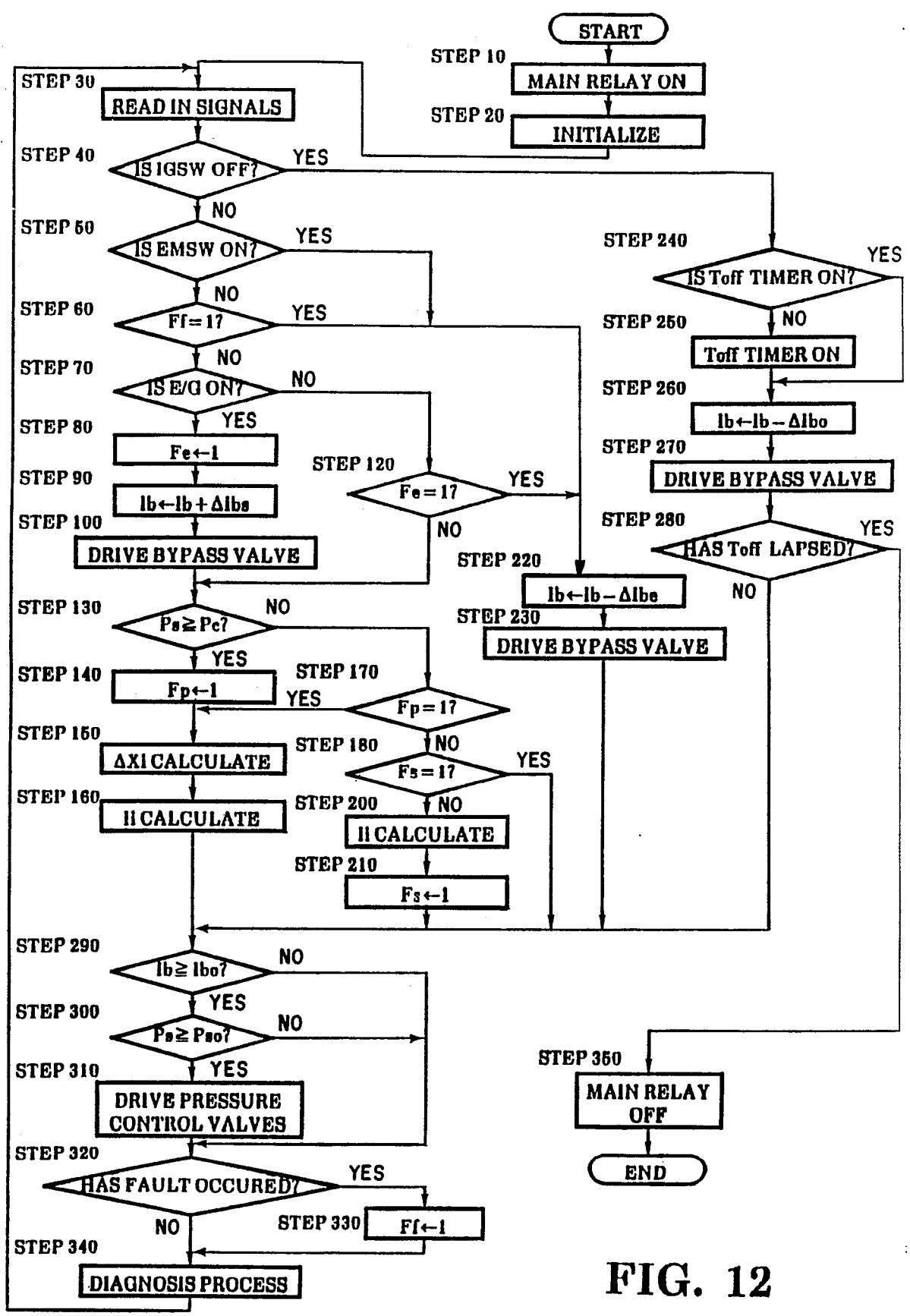
FIG. 12 is a flow chart showing a control flow of a cyclical program carried out by the electric control device shown in FIG. 11.

FIG. 10 is a schematic diagram, similar to FIG. 1, showing major physical components of the second preferred embodiment of the present invention, FIG. 11 is a block diagram, similar to FIG. 2, showing an electric control device of the second embodiment, and FIG. 12 is a flow chart showing a control flow of a cyclical program carried out by the electric control device shown in FIG. 11.

In this second embodiment, as is apparent from comparing FIGS. 10 and 11 with FIGS. 1 and 2, respectively, the pressure sensors for detecting the pressures within the working fluid chamber are not provided which correspond to the sensors 199FL, 99FR, 199RL and 199RR in the first embodiment. As is also apparent from comparing FIG. 12 with FIG. 3, the Ts timer is not utilized and accordingly the steps corresponding to the steps 110 and 190 in the flow chart shown in FIG. 3 are omitted. The ROM 206 incorporated in the microcomputer 202 in the electric control device 200 stores the map corresponding to the graph shown in FIG. 13 in addition to the maps corresponding to the graphs showing in FIGS. 4 through 6.

Figure 13:
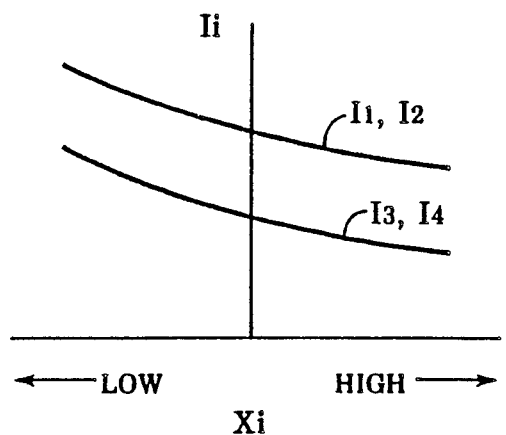
FIG. 13 is a graph showing the relationship between the vehicle heights Xi and the electric currents Ii supplied to the pressure control valves.

In the flow chart shown in FIG. 12, in the step 200, the values of the electric currents Ii ($i=1, 2, 3$ and 4) are calculated which are supplied to the solenoids 78, 58, 82 and 80 incorporated within the variable flow restrictions 72, 54, 76 and 74 in the pressure control valves 34, 32, 38 and 36 so that the controlling pressures of the pressure control valves, i.e., the standby pressures Pbi ($i=1, 2, 3$ and 4) may be controlled to the values which are substantially equal to the pressures Pi within the working fluid chambers 2FL, 2FR, 2RL and 2RR according to the map corresponding to the graph shown in FIG. 13 and stored in ROM 206, and then the flow of control passes next to the step 210.

Thus in this second embodiment, as is the case with the first embodiment, when the hydraulic suspension system is started to operate. in the steps 40, 50 and 60 a decision of NO is made, and in the stage where the engine has not yet been started a decision of NO is made in the step 70. As shown in FIG. 8, as the engine is started at the time point when a certain period of time Tx has elapsed after the ignition switch was turned on in the step 70 a decision of YES is made, and in the step 90 the electric current Ib is calculated according to the map which corresponds to the graph shown in FIG. 4. As shown in FIGS. 4 and 8, the electric current Ib is zero in the period $Ts_1$ after the engine has been started and thereafter the electric current Ib is gradually increased over a period of time ($Ts_2-Ts_1$) to a value I1 which is high enough to close the bypass valve completely.

After the engine has been started, in the steps 130, 170 and 180 a decision of NO is made; in the step 200 the electric currents Ii supplied to the pressure control valves are calculated according to the map corresponding to the graph shown in FIG. 13; and in the step 310 these control electric currents are supplied to the associated pressure control valves so that the controlling pressures of the pressure control valves, i.e., the pressures within the connecting flow lines between the pressure control valves and the associated cut-off valves are adjusted to the standby pressures Pbi which are substantially equal to the associated pressures Pi within the working fluid chambers.

Thus, according to the first and the second embodiments, since each cut-off valve is opened with the pressures on both sides thereof within the connecting flow line being substantially equal to each other, the vehicle heights are positively prevented from temporarily varying rapidly due to the fact that a relatively much volume of working fluid flows through each cut-off valve when it opens.

In the embodiments, when the hydraulic suspension system is started to operate, the bypass valve is gradually closed to increase gradually the pressure within the high pressure flow line so that each cut-off valve is gradually opened, and, therefore, even though a pressure difference exists to some degree across the cut-off valve, a temporary abrupt change in vehicle height can be avoided and a high accuracy is not needed in controlling the standby pressures referred to above.

Furthermore, since the bypass valve is gradually closed after the engine has been started and put into under the normal operating condition, the engine is surely prevented from stopping due to the abrupt load increase on the pump and the engine during the starting stage of the hydraulic suspension system and the pressure of the working fluid within the high pressure flow line can be gradually increased.

It is to be noted, however, that since the noise caused by the pressure pulsation of the working fluid discharged by the pump is relatively high during the initial stage when the bypass valve has been started to close to thereby increase the pressure within the high pressure flow line 18 but the pressure has not yet been increased to the set pressure of the attenuator, the calculation of the electric current Ib in the step 90 may be performed so that it may vary according to the pattern shown in the dotted line in FIG. 4. That is to say, as shown in FIG. 8, the electric current Ib may be increased relatively steeply until the time point when the electric current reaches the value Io which can open the bypass valve enough to set the pressure within the high pressure flow line 18 to the set pressure of the attenuator, and thereafter may be gradually increased to the value I1, which can reduce the noise due to the discharging pulsation caused by the pump.

Figure 9:
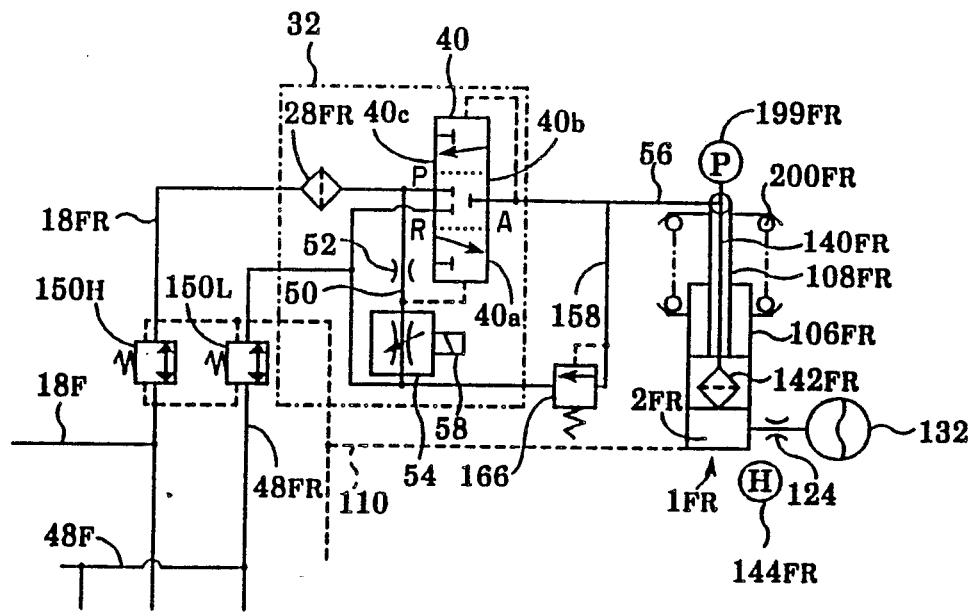
FIG. 9 is a schematic partial diagram showing major physical components of the modified embodiment of the hydraulic suspension system according to the present invention.

Although each cut-off valve is provided between the associated pressure control valve and the actuator in the above mentioned embodiments, it may be incorporated on the opposite side from the actuator relative to the pressure control valve. An example of such a modified embodiment is shown in FIG. 9 which shows major physical components in the area corresponding to the front right vehicle wheel not shown. In FIG. 9, cut-off valves 150H and 150L are provided in the high pressure flow line 18FR and the low pressure flow line 48FR, respectively. In such modified embodiment each pressure control valve in fact can not control the pressure of the working fluid until the associated cut-off valve opens, but begins its pressure control when the associated cut-off valve opens so that its actual control sling pressure is adjusted to the valve which is substantially equal to the pressure within the associated working fluid chamber. In this modified embodiment, therefore, a temporary abrupt change in vehicle height can positively be prevented from occurring due to the fact that a relatively large volume of the working fluid flows through each pressure control valve when the associated cut-off valve opens.

Figure 14:
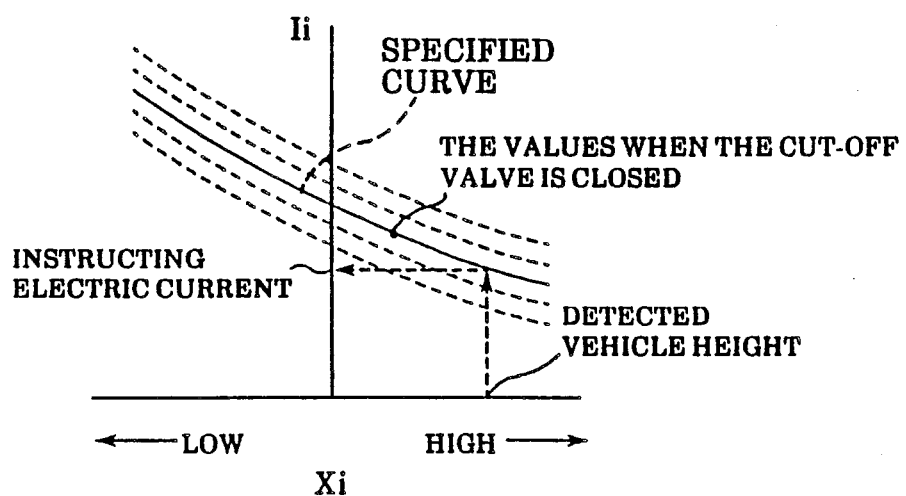
FIG. 14 is a schematic diagram illustrating an alternative manner for determining the electric currents Ii supplied to the pressure control valves.

Further, while in the above mentioned second embodiment the relationships between the vehicle heights Xi and the electric currents Ii are fixedly defined for the front and the rear vehicle wheels, a certain number of curves for several relationships may be defined on the Xi—Ii map as shown in FIG. 14. In such a system, the vehicle heights Xi and the instructing electric currents Ii for the pressure control valves which correspond to the pressures within the associated working fluid chambers may be stored in a non-volatile memory when the supply pressure is reduced to a level lower than a predeterminate pressure, i.e., the cut-off valves are closed; particular curves on the map may be specified based upon the stored Xi and Ii; and the electric currents Ii for instructing the pressure control valves may be determined according to the specified curves and the vehicle heights detected later.

The third preferred embodiment

Figure 15:
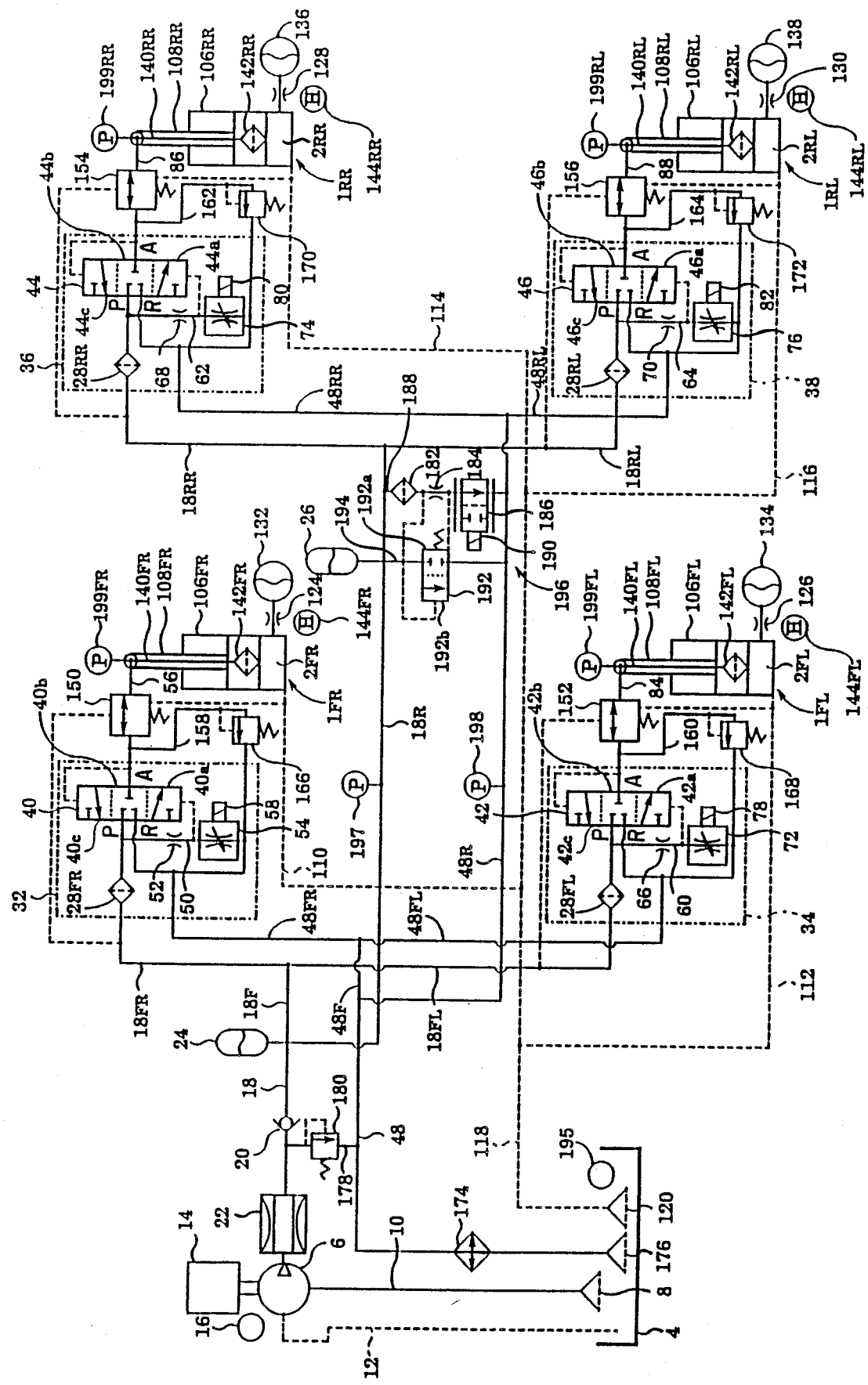
FIG. 15 is a schematic diagram showing major physical components of the third preferred embodiment of the hydraulic suspension system according to the present invention.
Figure 16:
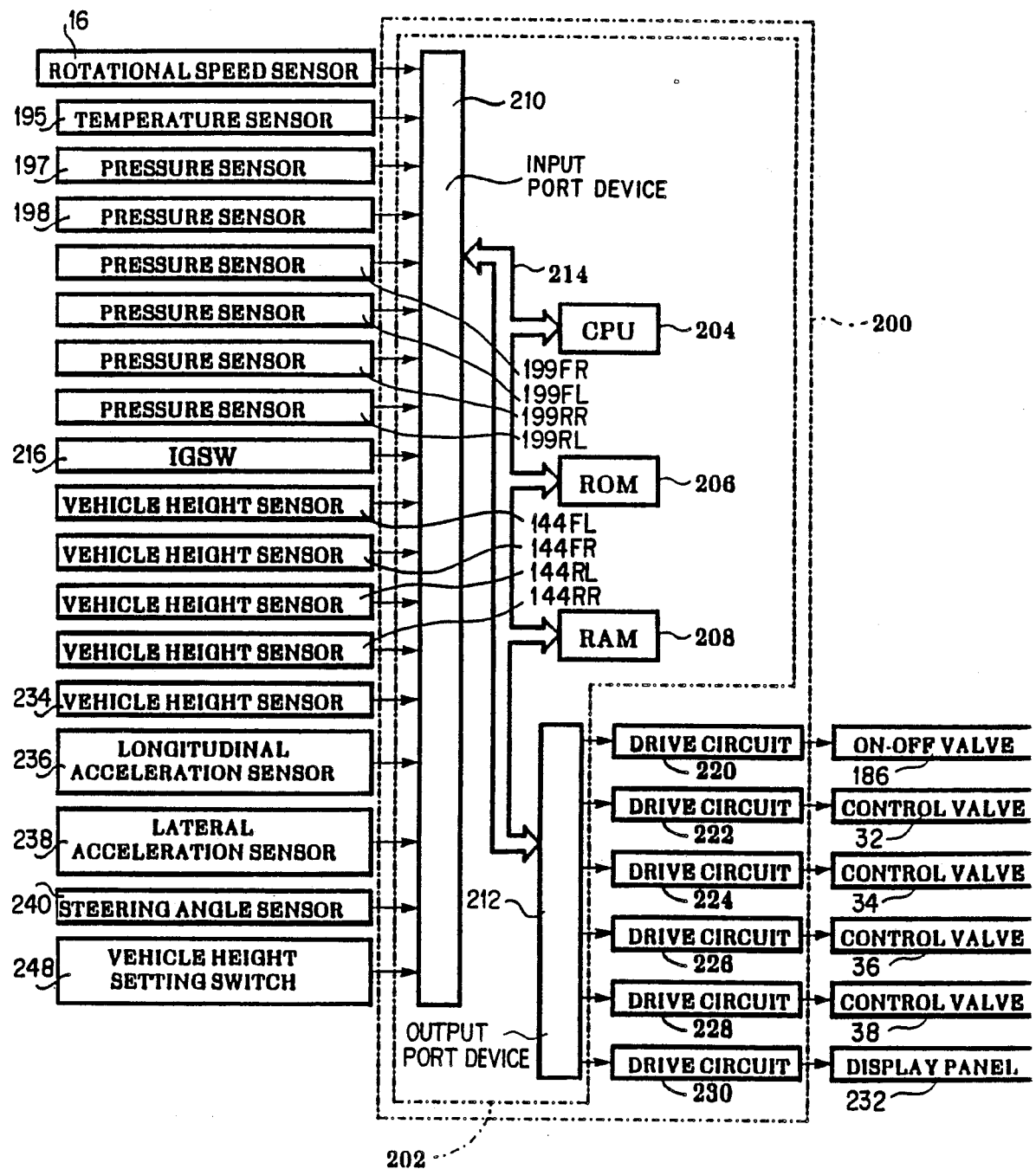
FIG. 16 is a block diagram, similar to FIG. 2, showing an electric control device of the third embodiment.
Figure 17:
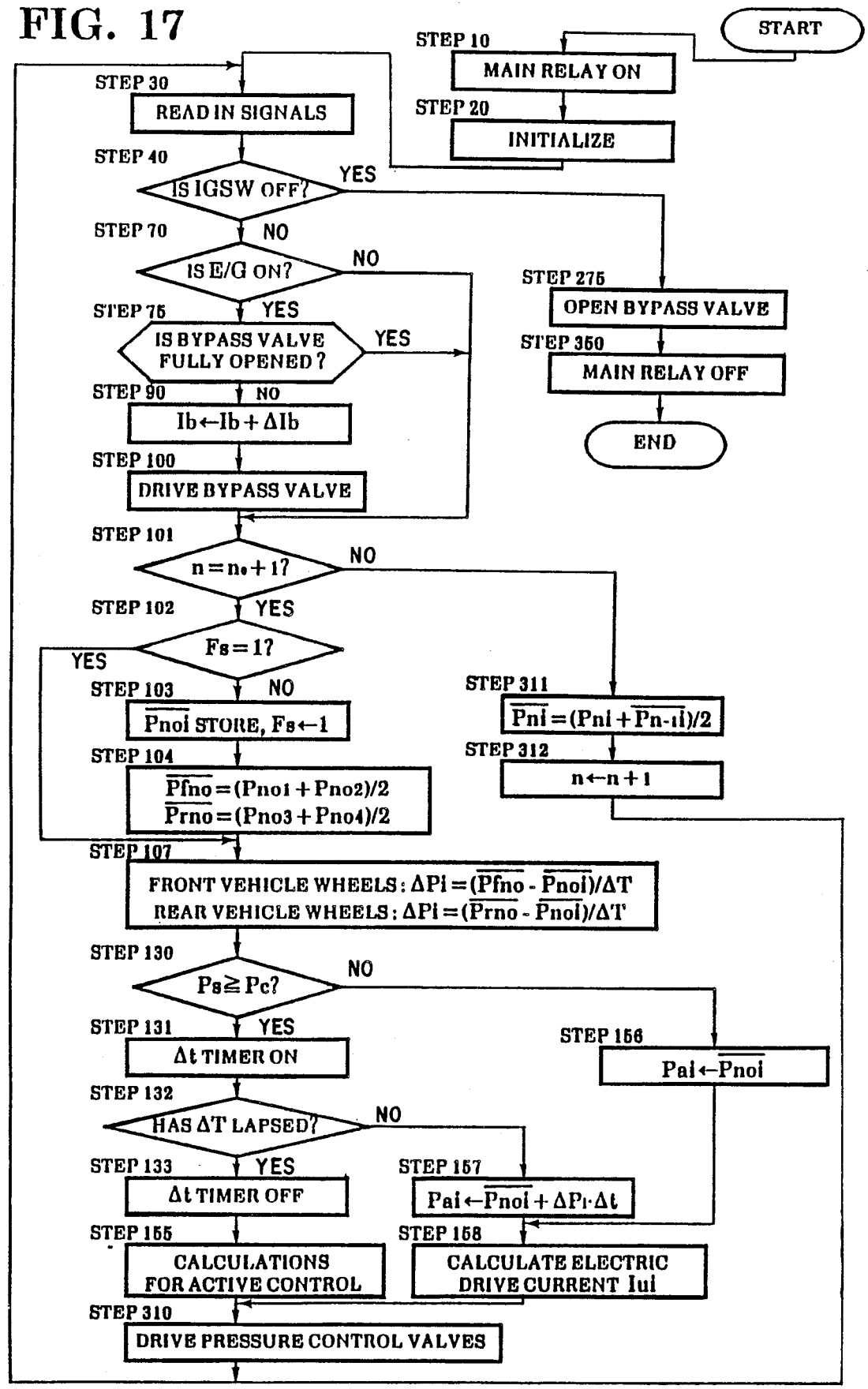
FIG. 17 is a flow chart showing a control flow of a cyclical program carried out by the electric control device shown in FIG. 16.

FIG. 15 is a schematic diagram, similar to FIG. 1, showing major physical components of the third preferred embodiment of the present invention, FIG. 16 is a block diagram, similar to FIG. 2, showing an electric control device of the third embodiment, and FIG. 17 is a flow chart showing a control flow of a cyclical program carried out by the electric control device shown in FIG. 16. As will be realized, the compression coil springs are not shown in FIG. 15 for the sake of clarity.

In this embodiment, as shown in FIG. 15, a temperature sensor 195 is provided in the reserve tank 4 for detecting the temperature T of the oil within the tank. In addition to the pressure sensor 197 connected to the high pressure flow line 18R, a pressure sensor 198 is connected to the low pressure flow line 48R for detecting the oil pressure within the flow line.

As is apparent from comparing FIG. 16 with FIG. 2, the input port device 210 in the microcomputer 202 is supplied with a signal indicative of the rotational speed Nr of the engine 14 from the rotational speed sensor 16, a signal indicative of the temperature T of the oil from the temperature sensor 195, signals indicative of the pressures Ps and Pd within the high pressure and the low pressure flow line from the pressure sensors 197 and 198, respectively, signals indicative of the pressures Pi (i=1, 2, 3 and 4) within the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, and signals indicative of the vehicle heights Xi (i=1, 2, 3 and 4) at the locations corresponding to the front left wheel, the front right wheel, the rear left wheel, and the rear right wheel from the vehicle height sensors 144FL, 144FR, 144RL and 144RR, respectively.

Additionally the input port device 210 is supplied with a signal indicative of a vehicle speed V from a vehicle speed sensor 234, a signal indicative of a longitudinal acceleration Ga from a longitudinal acceleration sensor 236, a signal indicative of a lateral acceleration Gl from a lateral acceleration sensor 238, a signal indicative of a steering angle theta from a steering angle sensor, and a signal indicative of whether the mode for controlling the vehicle height set by a vehicle height setting switch 248 is a high mode or a normal mode. The switch 248 is provided in the cabin to be operated by a driver or a passenger according to his taste.

Figure 18:
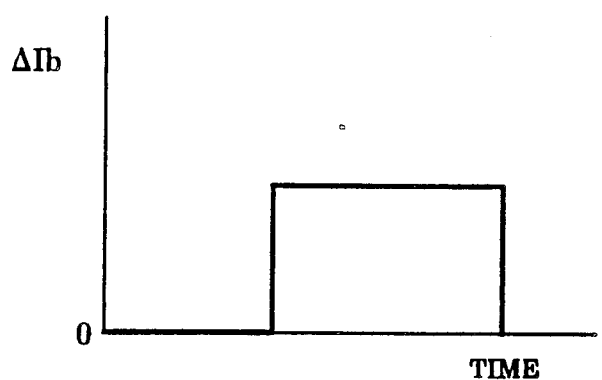
FIG. 18 is a graph showing the map utilized in calculating the electric current Ib which is supplied to the bypass valve at the stage when the hydraulic suspension system is started.
Figure 19:
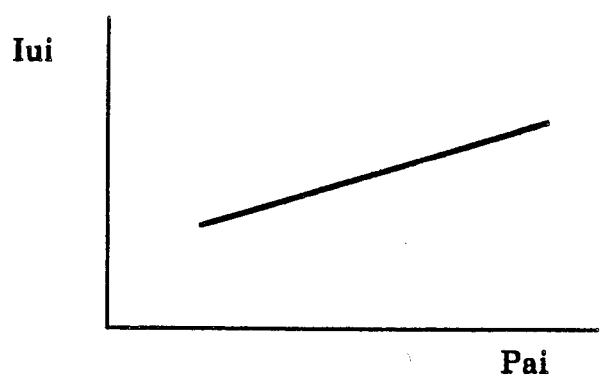
FIG. 19 is a graph showing the relationship between the desired values Pai of the pressures within the working fluid chambers in the actuators and the electric current Iui supplied to the pressure control valves.
Figure 20A:
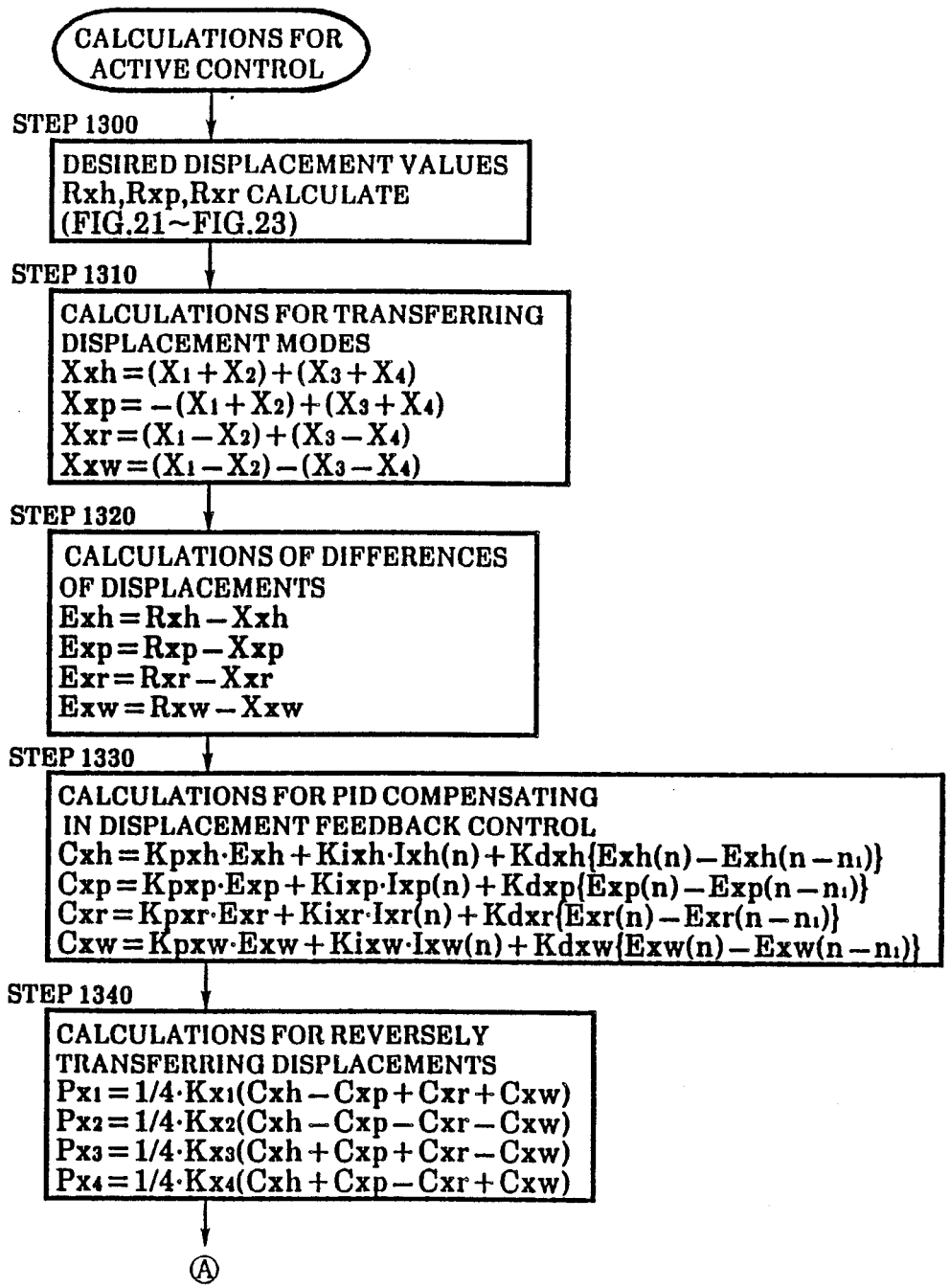
Figure 20B:
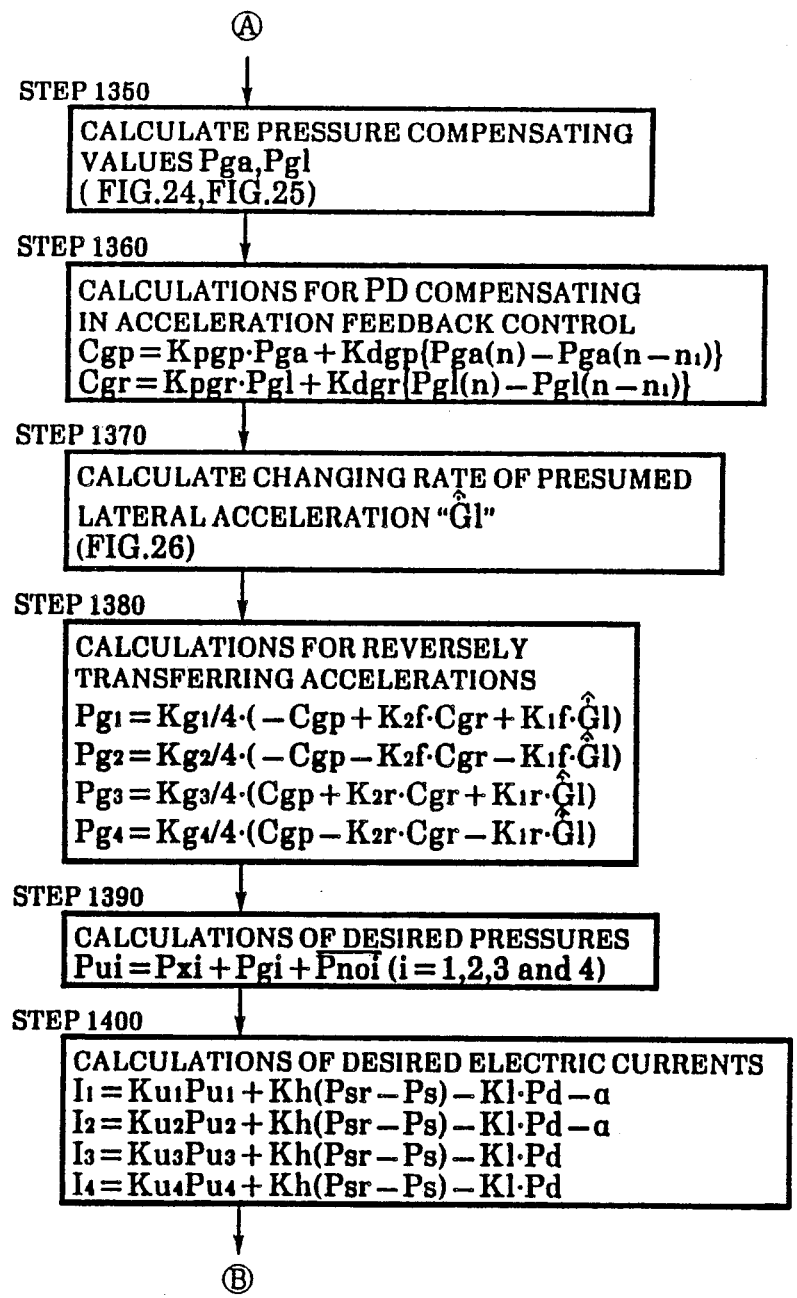

The ROM 206 incorporated in the microcomputer 202 stores the control flow shown in FIG. 17 and the maps corresponding to the graphs shown in FIGS. 18 and 19.

Referring now to the general flow chart shown in FIG. 17, the operation of the third embodiment is explained.

In this connection, it is to be noted that a flag Fs is related to whether or not standby pressures $\overline{Pnoi}$ (i=1, 2, 3 and 4) referred to later have been set for the pressure control valves 34, 32, 38 and 36, and one means that the standby pressures have been set.

In the step 30, a read in the signal indicative of the rotational speed Nr of the engine 14 detected by the rotational speed sensor 16, the signal indicative of the temperature T of the oil detected by the temperature sensor 195, signals indicative of the pressures Ps and Pd within the high pressure and low the pressure flow line detected by the pressure sensors 197 and 198, respectively, the signals indicative of the pressures Pi within the working fluid chambers 2FL, 2FR, 2RL and 2RR detected by the pressure sensors 199FL 199FR, 199RL and 199RR, the signal indicative of whether or not the ignition switch 216 is on, the signals indicative of the vehicle heights Xi detected by the vehicle height sensors 144FL, 144FR, 144RL and 144RR, the signal indicative of the vehicle speed V detected by the speed sensor 234, the signal indicative of the longitudinal acceleration Ga detected by the longitudinal acceleration sensor 236, the signal indicative of the lateral acceleration Gl detected by the lateral acceleration sensor 238, the signal indicative of the steering angle theta detected by the steering angle sensor 240, and the signal indicative of whether or not the mode for controlling the vehicle height set by the vehicle height setting switch 248 is the high mode or the normal mode, and then the flow of control passes next to the step 40.

In the step 75 which is carried out after the procedure in the step 70 has been completed, a decision is made as to whether or not the bypass valve is fully opened. If a decision is made that the bypass valve is fully opened, then the flow of control proceeds to the step 101, and if a decision is made that the bypass valve is not fully opened, then the flow of control passes to the next step 90.

In the step 101 which is carried out after the procedure in the step 100 has been completed, letting no represent a predeterminate value, a decision is made as to whether or not "n" in the equation in the step 158 referred to later is no+1. If a decision is made that n is not no+1, then the flow of control is transferred to the step 311, and if n is no+1, then the flow of control passes next to the step 102.

In the step 102, a decision is made as to whether or not the flag Fs is one. If a decision is made that the flag Fs is one, then the flow of control is transferred to the step 107, and if a decision is made that the flag Fs is not one, then the flow of control proceeds to the next step 103.

In the step 103, the standby pressures $\overline{Pnoi}$ for the pressure control valves which are calculated in the step 311 with n being set to no are stored in RAM 208, the flag Fs is set to one, and then the flow of control passes next to the step 104.

In the step 104, the average value $\overline{Pfno}$ of the standby pressures Pno1 and Pno2 for the front vehicle wheel and the average value $\overline{Prno}$ of the standby pressures Pno3 and Pno4 for the rear vehicle wheels are calculated, and thereafter the flow of control passes to the next step 107.

In the step 107, a pressure compensating values delta Pi (i=1 and 2) for the front vehicle wheels and pressure compensating values delta Pi (i=3 and 4) for the rear vehicle wheels are calculated according to the following equations, and then the flow of control proceeds to the next step 130.

$$\text{delta } Pi = (\overline{Pfno} - \overline{Pnoi})/\text{delta } T \ (i=1, 2)$$

$$\text{delta } Pi = (\overline{Prno} - \overline{Pnoi})/\text{delta } T \ (i=3, 4)$$

In the step 131 which is carried out after the procedure in the step 130 has been completed, delta t timer for counting the time after the time point when a decision has been made in the step 130 that the pressure Ps is equal to or higher than Pc is started to count, and then the flow of control passes next to the step 132.

In the step 132, a decision is made as to whether or not a predetermined period of time delta T has lapsed. If the decision is made that the time delta T has not yet rapped, then the flow of contrl is transferred to the step 157, and if a decision is made that the time delta T has lapsed, then the flow of control proceeds to the step 133.

In the step 133, delta t timner is stopped, and then the flow of control passes next to the step 155.

In the step 155, as will be described in detail referring to FIGS. 20A through 20C and FIGS. 21 through 23, in order to control the comfortability of the vehicle and the attitude of the vehicle body, the calculations for the active control are performed based upon the data read in the step 30 to calculate the electric currents Iui supplied to the solenoid 78, 58, 82 and 80 incorporated in the variable flow restrictions 72, 54, 76 and 74 in the pressure control valves, and then the flow of control proceeds to the next step 310.

In the step 156, the desired controlling pressures Pai for the pressure control valveds are set to the pressures $\overline{Pnoi}$ which are calculated in the step 311 referred to later and are stored in the step 103, and then the flow of control proceeds to the step 158.

In the step 157, based upon the standby pressures $\overline{Pnoi}$ stored in the step 103 and the compensating values delta Pi calculated in the step 105, the desired controlling pressures Pai for the pressure control valves are set to $\overline{Pnoi}$+delta Pi·delta t, and then the flow of control passes next to the step 158.

In the step 158, from the desired controlling pressures Pai set in the step 156 or 157, driving electric currents Iui supplied to the pressure control valves are calculated according to the map corresponding to the graph shown in FIG. 19, and then the flow of control proceeds to the next step 310.

In the step 311, letting Pni represent the present pressures within the working fluid chambers in the actuators detected by the pressure sensors 199FL, 199FR, 199RL and 199RR and $P_{n-1}i$ denote the absolute values of the pressures within the working fluid chambers which are calculated in the step 311 one cycle before, the average values $\overline{Pni}$ of the pressures within the working fluid chambers are calculated according to the following equations, and then the flow of control proceeds to the next step 312.

$$\overline{Pni} = (Pni + \overline{P_{n-1}i})/2 (n=1, 2, 3 \ldots no)$$

In the step 312, "n" in the equations in the step 311 in the next cycle is set to n+1, and then the flow of control is returned to the step 30.

In the step 275, the bypass valve 196 is opened by stopping the supply of the electric current to the solenoid 190 in the electromagnetic on-off valve 186, and the flow of control passes next to the step 350.

Referring next to the FIGS. 20A through 20C and FIGS. 21 through 27, the calculations for the active control conducted in the above-mentioned step 155 will be explained.

Figure 21:
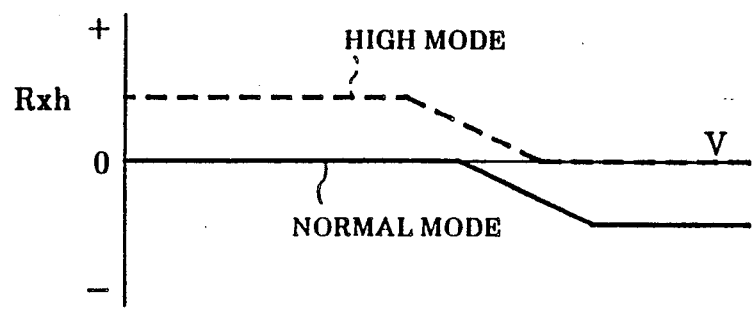
FIG. 21 is a graph showing the relationship between a vehicle speed V and a desired displacement Rxh of heave.
Figure 22:
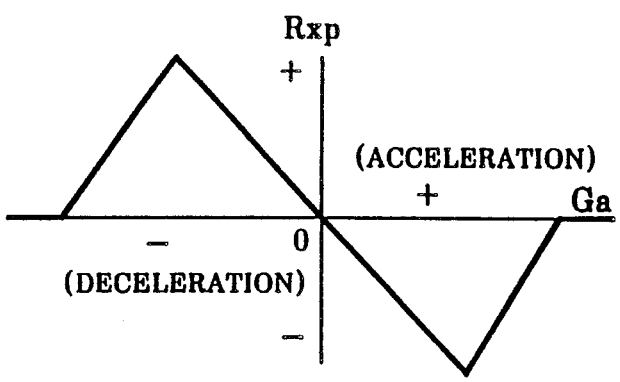
FIG. 22 is a graph showing the relationship between a longitudinal acceleration Ga and a desired displacement Rxp of pitch.
Figure 23:
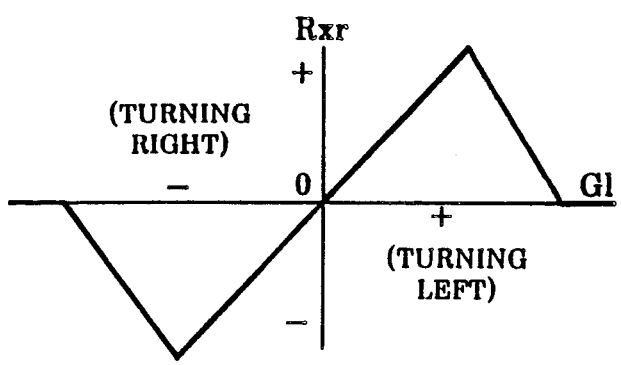
FIG. 23 is a graph showing the relationship between a lateral acceleration Gl and a desired displacement Rxr of roll.

In the step 1300, based upon the maps corresponding to the graphs shown in FIGS. 21 through 23, desired values Rxh, Rxp and Rxr of heave, pitch and roll, respectively, for attaining a desired attitude of the vehicle body are calculated, and then the flow of control passes next to the step 1310.

It is to be noted that in FIG. 21, the solid line shows a pattern wherein the mode for controlling vehicle heights set by the vehicle height setting switch is the normal mode and the dotted line shows a pattern wherein the mode is the high mode.

In the step 1310, based upon the vehicle heights $X_1$, $X_2$, $X_3$ and $X_4$ at the locations corresponding to the front left, front right, rear left, and rear right vehicle wheels read in in the step 1310, calculations for transferring the displacements into values of heave "Xxh", pitch "Xxp", roll "Xxr" and warp "Xxw" are carried out according to the following equations, and thereafter the flow of control passes next to the step 1320.

$$Xxh = (X_1 + X_2) + (X_3 + X_4)$$

$$Xxp = -(X_1 + X_2) + (X_3 + X_4)$$

$$Xxr = (X_1 - X_2) + (X_3 - X_4)$$

$$Xxw = (X_1 - X_2) - (X_3 - X_4)$$

In the step 1320, the differences of the displacement mode values are calculated according to the following equations, and next the flow of control passes to the step 1330.

$$Exh = Rxh - Xxh$$

$$Exp = Rxp - Xxp$$

$$Exr = Rxr - Xxr$$

$$Exw = Rxw - Xxw$$

In this connection, Rxw may be zero, or Xxw calculated in the step 1310 just after the hydraulic suspension system has been started to operate or the average value of Xxws calculated in the last few cycles. If the absolute value of Exw is equal to or less than W1 which is a positive constant, Exw is then set to zero.

In the step 1330, calculations for PID compensations in displacement feedback control are conducted according to the following equations, and thereafter the flow of control passes next to the step 1340.

$$Cxh = Kpxh \cdot Exh + Kixh \cdot Ixh(n) + Kdxh\{Exh(n-) - Exh(n-n_1)\}$$

$$Cxp = Kpxp \cdot Exp + Kixp \cdot Ixp(n) + Kdxp\{Exp(n-) - Exp(n-n_1)\}$$

$$Cxr = Kpxr \cdot Exr + Kixr \cdot Ixr(n) + Kdxr\{Exr(n-) - Exr(n-n_1)\}$$

$$Cxw = Kpxw \cdot Exw + Kixw \cdot Ixw(n) + Kdxw\{Exw(n-) - Exw(n-n_1)\}$$

It should be noted that in the above equations, $Ej(n)$ ($j = xh, xp, xr$ and $xw$) are the present values of $Ej$, and $Ej(n-n_1)$ are values of $Ej$ obtained n1 cycles before. Assuming $Ij(n)$ and $Ij(n-1)$ are values of $Ij$ of the present cycle and one cycle before, respectively, and $Tx$ is a time constant, they have the following relationship.

$$Ij(n) = Ej(n) + Tx \cdot Ij(n-1)$$

If the absolute values of $Ij$ exceed $Ijmax$ which are predetermined values, then $Ij$ are set to $Ijmax$. Further, the coefficients $Kpj$, $Kij$, $Kdj$ ($j = xh, xp, xr$ and $xw$) are proportional constants, integral constants and differential constants, respectively.

In the step 1340, calculations for reversely transferring the displacement modes are carried out according to the following equations, and then the flow of control proceeds crosses to the step 1350.

$$Px_1 = \tfrac{1}{4} \cdot Kx_1(Cxh - Cxp + Cxr + Cxw)$$

$$Px_2 = \tfrac{1}{4} \cdot Kx_2(Cxh - Cxp - Cxr - Cxw)$$

$$Px_3 = \tfrac{1}{4} \cdot Kx_3(Cxh + Cxp + Cxr - Cxw)$$

$$Px_4 = \tfrac{1}{4} \cdot Kx_4(Cxh + Cxp - Cxr + Cxw)$$

where $Kx_1$, $Kx_2$, $Kx_3$ and $Kx_4$ are proportional constant

Figure 24:
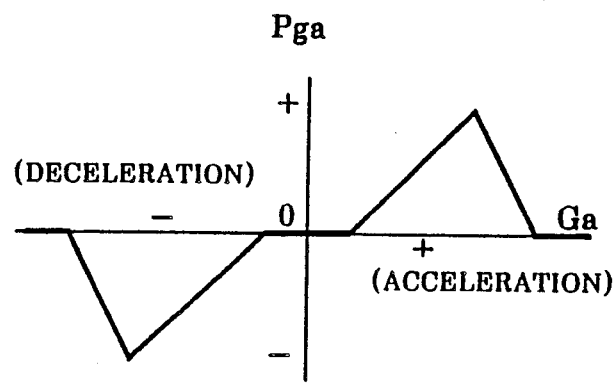
FIG. 24 is a graph showing the relationship between a longitudinal acceleration Ga and a pressure compensating value Pga.
Figure 25:
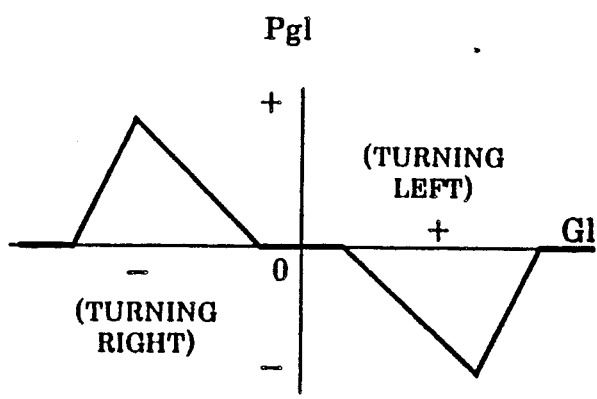
FIG. 25 is a graph showing the relationship between a lateral acceleration Gl and a pressure compensating value Pgl.

In the step 1350, based upon the maps corresponding to the graphs shown in FIGS. 24 and 25, pressure compensating values $Pga$ and $Pgl$ in the longitudinal and lateral directions, respectively, and then the flow of control passes next to the step 1360.

In the step 1360, calculations for PD compensations on pitch ($Cgp$) and roll ($Cgr$) in acceleration feedback control are conducted according to the following equations, and thereafter the flow of control proceeds to the next step 1370.

$$Cgp = Kpgp \cdot Pga + Kdgp\{Pga(n) - Pga(n-n_1)\}$$

$$Cgr = Kpgr \cdot Pgl + Kdgr\{Pgl(n) - Pgl(n-n_1)\}$$

It is to be noted that $Pga(n)$ and $Pgl(n)$ are present $Pga$ and $Pgl$, respectively, and $Pga(n-n_1)$ and $Pgl(n-n_1)$ are $Pga$ and $Pgl$ at the cycle which is $n_1$ cycles before. $Kdgp$ and $Kdgr$ are proportional constants, while $Kdgp$ and $Kdgr$ are differential constants.

Figure 26:
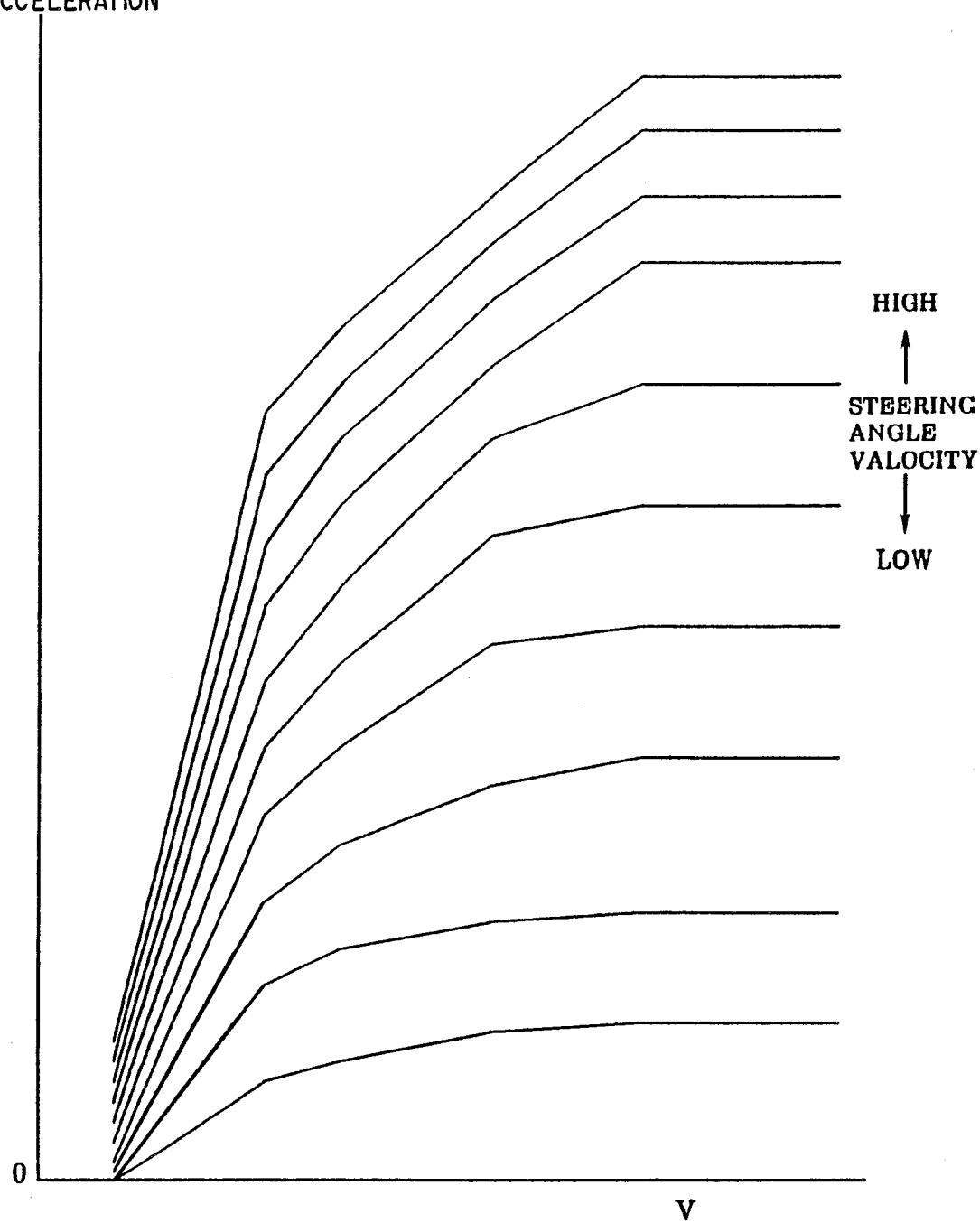
FIG. 26 is a graph showing the relationship between a vehicle speed V, a steering angle velocity delta theta and the changing rate Gl of a presumed lateral acceleration.

In the step 1370, letting theta′ represent a steering angle read in in the step 30 one cycle before in the flow chart shown in FIG. 17, steering angle velocity delta theta is calculated according to the following equation:

$$\text{delta theta} = \text{theta} - \text{theta}'$$

and the based upon the map corresponding to the graph shown in FIG. 26 and from the steering angle velocity calculated above and a vehicle speed V, the rate of change in presumed lateral acceleration "$\hat{Gl}$" is calculated, and thereafter the flow of control passes next to the step 1380.

In the step 1380, calculations for reversely transferring acceleration modes are performed according to the following equations, and next the flow of control proceeds to the step 1390

$$Pg_1 = Kg_1/4 \cdot (-Cgp + K_2f \cdot Cgr + K_1f \cdot \hat{Gl})$$

$$Pg_2 = Kg_2/4 \cdot (-Cgp - K_2f \cdot Cgr - K_1f \cdot \hat{Gl})$$

$$Pg_3 = Kg_4/4 \cdot (Cgp + K_2r \cdot Cgr + K_1r \cdot Gl)$$

$$Pg_4 = Kg_4/4 \cdot (Cgp - K_2r \cdot Cgr - K_1r \cdot Gl)$$

where $Kg_1$, $Kg_2$, $Kg_3$ and $Kg_4$ are proportional constants, and $K_1f$, $K_1r$, $K_2f$ and $K_2r$ are constants serving as distributing gains between front and rear vehicle wheels.

In the step 1390, based upon the pressures $\overline{Pnoi}$ stored in RAM 208 in the step 110 and the calculated values obtained in the steps 1340 and 1380, desired controlling pressures $Pui$ of the pressure control valves are calculated according to the following equations and thereafter the flow of control proceeds to the step 1400.

$$Pui = Pxi + Pgi + \overline{Pnoi} \quad (i = 1, 2, 3 \text{ and } 4)$$

In the step 1400, desired electric currents supplied to the pressure control valves are calculated according to the following equations, and then the flow of control passes next to the step 1410.

$$I1 = Ku1 \cdot Pu1 + Kh(Psr - Ps) - Kl \cdot Pd - alpha$$

$$I2 = Ku2 \cdot Pu2 + Kh(Psr - Ps) - Kl \cdot Pd - alpha$$

$$I3 = Ku3 \cdot Pu3 + Kh(Psr - Ps) - Kl \cdot Pd$$

$$I4 = Ku4 \cdot Pu4 + Kh(Psr - Ps) - Kl \cdot Pd$$

It is to be noted that $Ku1$, $Ku2$, $Ku3$, $Ku4$ are proportional constants for corresponding vehicle wheels; $Kh$ and $Kl$ are compensating coefficients for pressures within the high pressure and the low pressure flow lines, respectively; alpha is a compensating constant between the front and rear vehicle wheels; and $Psr$ is a standard pressure within the high pressure flow line.

Figure 27:
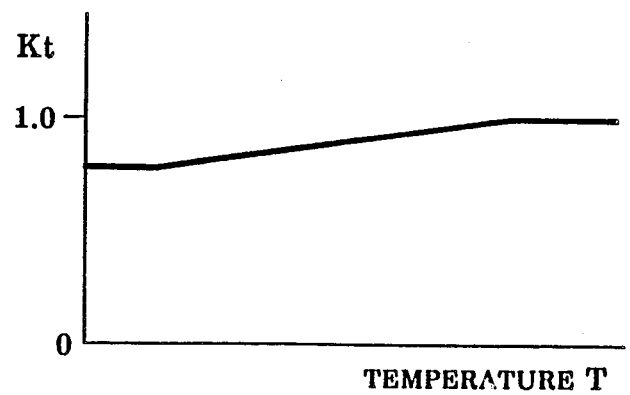
FIG. 27 is a graph showing the relationship between the temperature T of oil and a compensating coefficient Kt.

In the step 1410, based upon the temperature T of the oil read in in the step 30 and the map corresponding to the graph shown in FIG. 27, a coefficient $Kt$ for compensating for temperature is calculated, and the calculations for compensating the desired electric currents for temperature are effected according to the following equations, and then the flow of control passes next to the step 1420.

$$Iti = Kt \cdot Ii \quad (i = 1, 2, 3 \text{ and } 4)$$

In the step 1420, an electric current warp, i.e., a warp of the electric current values about the longitudinal axis of the vehicle body, is calculated according to the following equation, and then thereafter the flow of control proceeds to the step 1430.

$$Iw = (It_1 - It_2) - (It_3 - It_4)$$

In the step 1430, letting $Riw$ denote a desired electric current warp, a difference of the electric current warp is calculated according to the following equation, and next the flow of control proceeds to the step 1440.

$$Eiw = Riw - Iw$$

In the above equation the desired electric current warp Riw may be zero.

In the step 1440, letting Kiwp represent a proportional constant, a desired controlling value of the electric current warp is calculated according to the following equation, and then the flow of control passes to the next step 1450.

$$Eiwp = Kiwp \cdot Eiw$$

In the step 1450, calculations for reversely transferring the electric current warp are carried out according to the following equations, and thereafter the flow of control is transferred to the next step 1460.

$$Iw_1 = Eiwp/4$$

$$Iw_2 = -Eiwp/4$$

$$Iw_3 = -Eiwp/4$$

$$Iw_4 = Eiwp/4$$

In the step 1460, based upon the values obtained by the calculations conducted in the steps 1410 and 1450, final desired electric currents Iui supplied to the pressure control valves are calculated according to the following equations, and then the flow of control is transferred next to the step 220 shown in FIG. 3.

$$Iui = Iti + Iwi \ (i = 1, 2, 3 \text{ and } 4)$$

Figure 28:
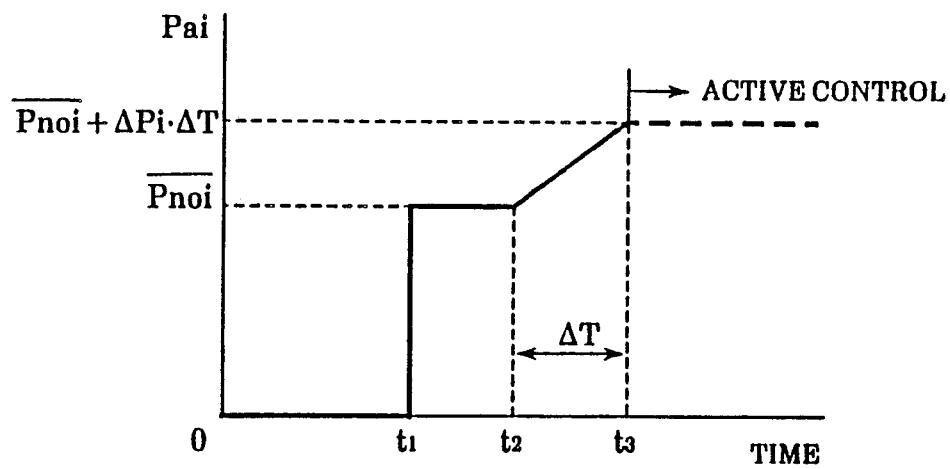
FIG. 28 is a time chart for illustrating the operation of the third embodiment of the hydraulic suspension system.
Figure 30:
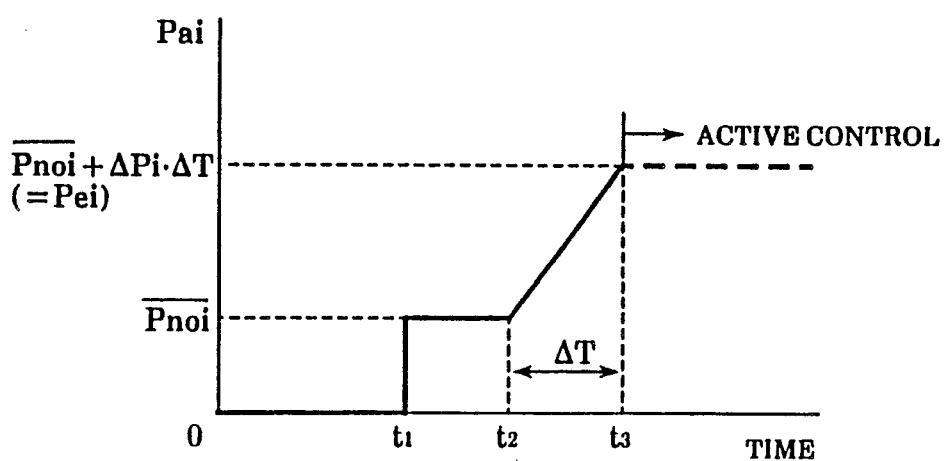
FIG. 30 is a time chart, similar to FIG. 28, for illustrating the operation of the fourth embodiment of the hydraulic suspension system.

Next, with reference to FIGS. 15 through 27 and the time chart shown in FIG. 28, the operation of the third embodiment will be explained.

In this embodiment, in the initial stage where the active suspension system is started to operate, average values $\overline{Pnoi}$ of the pressures Pi within the working fluid chambers in the actuators are calculated until n is equalized to no in the process where the pressure within the high pressure flow line is gradually increased in the steps 75, 90 and 100, and in the step 103 the average values $\overline{Pnoi}$ at the time point $t_1$ when n is equalized to no are stored in RAM 208 as the standby pressures. After the average values $\overline{Pnoi}$ have been stored in RAM, in the step 104 average value $\overline{Pfno}$ of the pressures within the working fluid chambers in the actuators for the front left and right vehicle wheels and average value $\overline{Prno}$ of the pressures within the working fluid chambers in the actuators for the rear left and right vehicle wheels are calculated, and in the step 107 compensating values delta Pi of pressure are calculated.

Until the time point $t_2$ when the pressure Ps within the high pressure flow line exceeds the threshold value Pc, in the step 190 desired controlling pressures Pai for the pressure control valves are set to the standby pressures $\overline{Pnoi}$ so that the shock due to rapid pressure change within the working fluid chambers when the cut-off valves 150, 152, 154 and 156 are opened enough for the pressure control valves actually to control the pressures within the working fluid chambers.

As the pressure Ps within the high pressure flow line has exceeded Pc at the time point $t_2$, in the step 157 the desired controlling pressures Pai are set so that the pressures within the working fluid chambers in the actuators for the front left and right vehicle wheels are gradually increased over a time delta T to the average pressure $\overline{Pfno}$ and the pressures within the working fluid chambers in the actuators for the rear left end right vehicle wheels are in gradually increased over a time delta T to the average pressure $\overline{Prno}$, which gradually reduces the pressure warp substantially to zero during the period of time from the time point $t_2$ to the point $t_3$. After the time point $t_3$, in the step 180 calculations for the active control are carried out according to the routine of the flow chart shown in FIGS. 20A through 20C, and in the step 310 the pressure control valves are controlled in accordance with the calculated results so as to control the comfortability and the attitude of the vehicle body.

Thus, according to this embodiment, since the active control by the pressure control valves is initiated with no pressure warp existing among the pressures within the working fluid chamber in the actuators, the shock due to the rapid change in the pressures within the working fluid chambers in the actuators can positively be prevented from occurring when the active control is initiated in which a pressure warp, if any, is adjusted substantially to zero.

The fourth preferred embodiment

Figure 29:
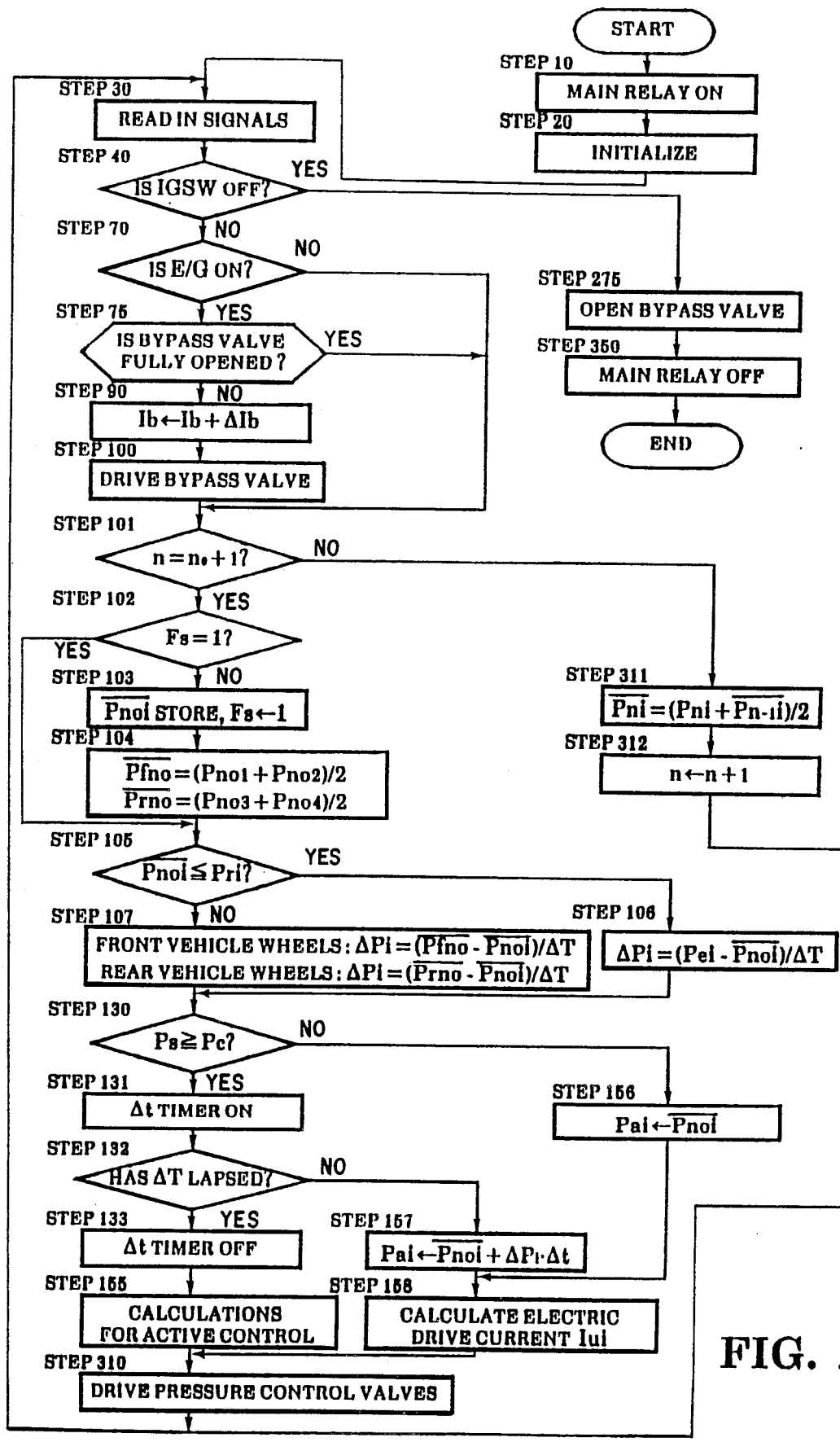
FIG. 29 is a flow chart, similar to FIG. 3, showing a control flow of a cyclical program carried out in the fourth preferred embodiment of the hydraulic suspension system according to the present invention.

FIG. 29 shows a flow chart, similar to FIG. 17, in the fourth embodiment of the hydraulic active suspension system according to the present invention.

In this embodiment, after the step 104 has been completed, the procedure in the step 105 is carried out. In the step 105, a decision is made as to whether or not the average pressure values $\overline{Pnoi}$ are not more than respective reference values Pri. If decisions are made that for all the vehicle wheels $\overline{Pnoi}$ are higher than the Pri, tghen the flow of control passes next to the step 107, and if a decision is made that for any of the vehicle wheels $\overline{Pnoi}$ is not higher than Pri, then the flow of control passes next to the step 106.

In this connection, the reference values Pri are so set that the pressure warp may substantially be zero.

In the step 106, letting Pei denote desired values so set that the pressure warp may substantially be zero, pressure compensating values delta Pi are calculated according to the following equations, and thereafter the flow of control is transferred to the step 130.

$$delta\ Pi = (Pei - \overline{Pnoi})/delta\ T$$

Thus, according to this emboidment, as shown in FIG. 16, when the average value $\overline{Pnoi}$ of the pressure Pi within the working fluid chamber in the actuator for any of the vehicle wheels is not higher than its reference value Pri, the desired controlling pressures Pai, i.e., the instructing pressures for the pressure control valves are gradually raised from the standby pressures $\overline{Pnoi}$ to the desired values Pei over the period of time from the time point $t_2$ to $t_3$, and the active control is initiated after the time point $t_3$ when the desired controlling pressures have become Pei. According to this fourth embodiment, therefore, since the pressure warp is eliminated by means of the pressure warp being reduced to zero in the same manner as in the third embodiment when the standby pressures $\overline{Pnoi}$ are higher than the reference values Pri and by means of the desired controlling pressures for pressure control valves being set to the desired values Pei wherein no pressure warp exists when the standby pressures $\overline{Pnoi}$ are not higher than the reference values Pri, and the active control is initiated with no pressure warp, the shock on the vehicle body can be prevented from being generated when a pressure warp, if any, is reduced by the active control initiated.

In the event where the pressure within the working fluid chamber in the actuator for any of the vehicle wheels has been decreased to a certain lower level due to a certain cause, the pressure within that working fluid chamber can be increased to its desired value Pei promptly and smoothly in comparison to the case wherein the pressure within that working fluid chamber is increased by the active control, and accordingly the vehicle heights at the locations corresponding to the vehicle wheels can rapidly and smoothly recovered to their normal levels.

While in the above mentioned third and fourth embodiments the pressures within the working fluid chambers in the actuators are detected and are averaged to calculate and set the standby pressures, they may be obtained by presuming the pressures within the working fluid chambers in the actuators according to the vehicle heights at the locations corresponding to the vehicle wheels in the same manner as in the above described second embodiment.

The pressures within the working fluid chambers in the actuators may be controlled by the control device shown in FIG. 16 according to the conditions under which the vehicle turns so as to control a steering characteristics properly in accordance with the turning conditions. Although in the system wherein the steering characteristic is thus controlled, a gain or gains for controlling pressure warp might be lowered or a signal indicative of pressure warp might be processed by a filter to normalize it so as to attenuate the shock caused on the vehicle body when the pressure warp is reduced by the active control after the pressures within the working fluid chambers have been set to their standby pressures, in those cases it would be difficult to actively generate a pressure warp during turning so as to control the steering characteristic with good response. In contrast to the above, according to the third embodiment, pressure warp is eliminated before the active control is initiated so that the effectiveness of the steering characteristic control is not reduced which is carried out by actively generating a pressure warp according to the turning conditions.

The fifth preferred embodiment

Figure 31:
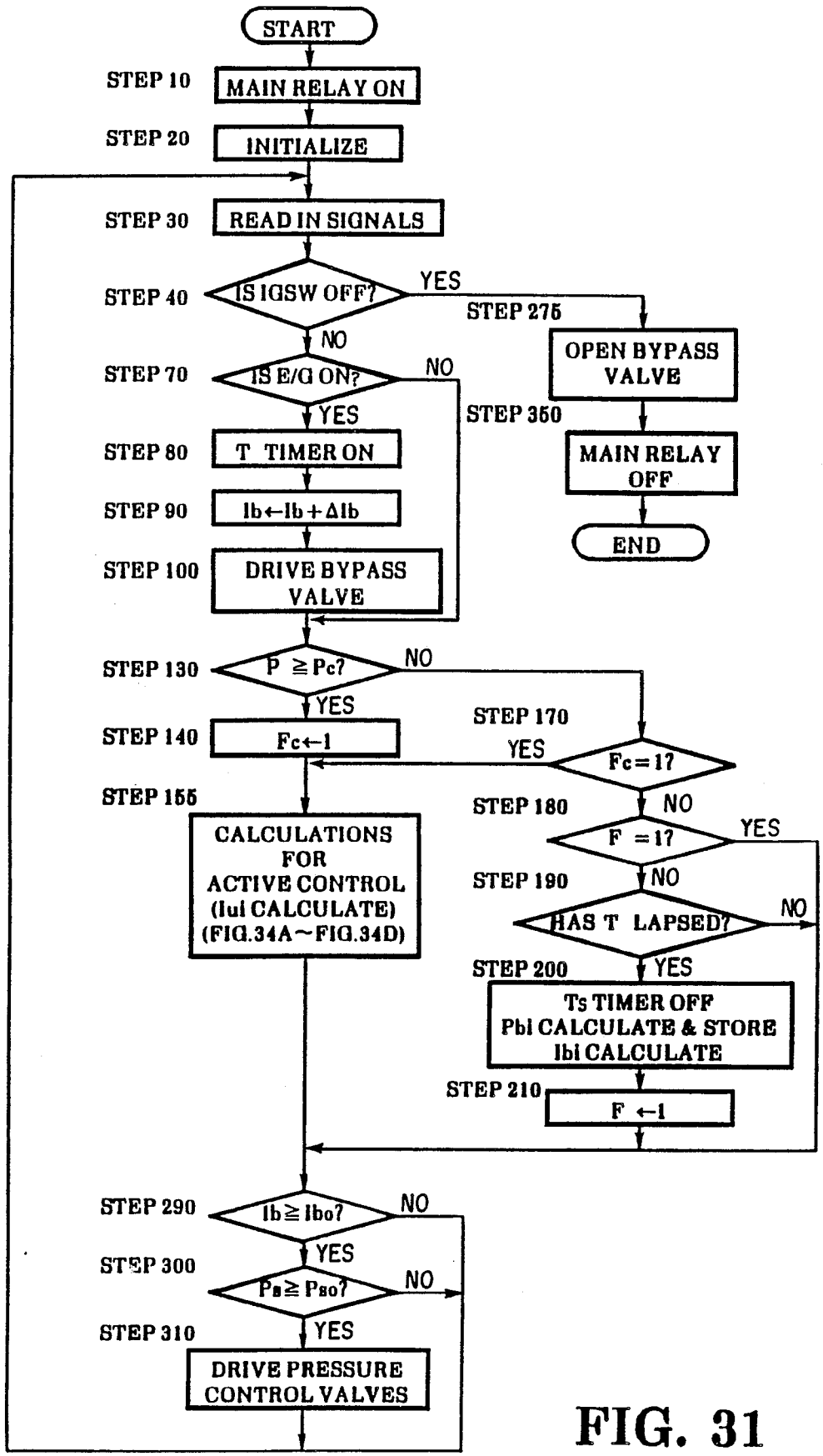
FIG. 31 is a general flow chart showing a control flow of a cyclical program carried out in the fifth preferred embodiment of the hydraulic suspension system according to the present invention.

FIG. 31 is a general flow chart showing a control routine of a cyclical program in the embodiment, and FIGS. 34A through 34D are flow charts showing the subroutine of the calculation for the active control carried out in the step 155 in the flow chart shown in FIG. 31.

In this embodiment, in the step 155, as will be described in detail referring to FIGS. 34A through 34D and FIGS. 32 and 33, in order to control the comfortability and the attitude of the vehicle body, the calculations for the active control are performed based upon the date read in in the step 30 to calculate the electric currents Iui supplied to the solenoid 78, 58, 82 and 80 incorporated in the variable flow restrictions 72, 54, 76 and 74 in the pressure control valves, and then the flow of control proceeds to the next step 290.

Figure 32:
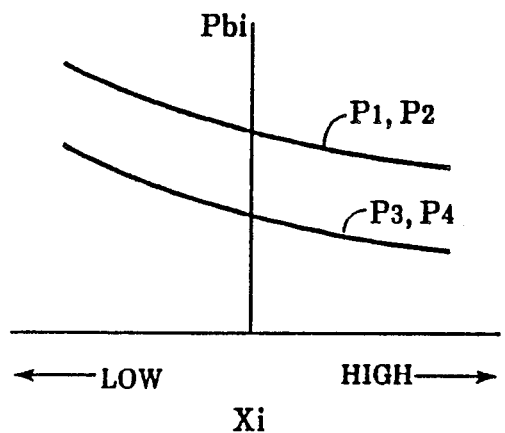
FIG. 32 is a graph showing the relationship between the vehicle heights Xi detected by the vehicle height sensors and the standby pressures Pbi within the working fluid chambers in the actuators.
Figure 33:
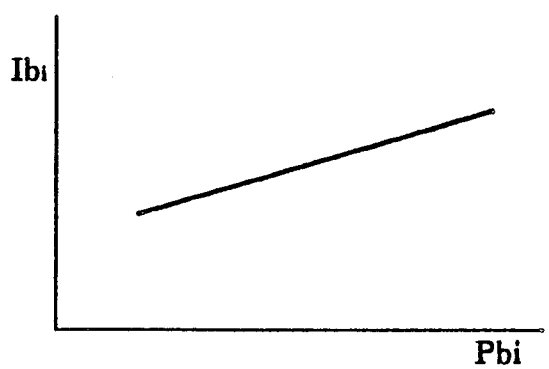
FIG. 33 is a graph showing the relationship between the standby pressures Pbi within the working fluid chambers in the actuators and the standby pressure electric currents Ibi supplied to the pressure control valves.
Figure 34A:
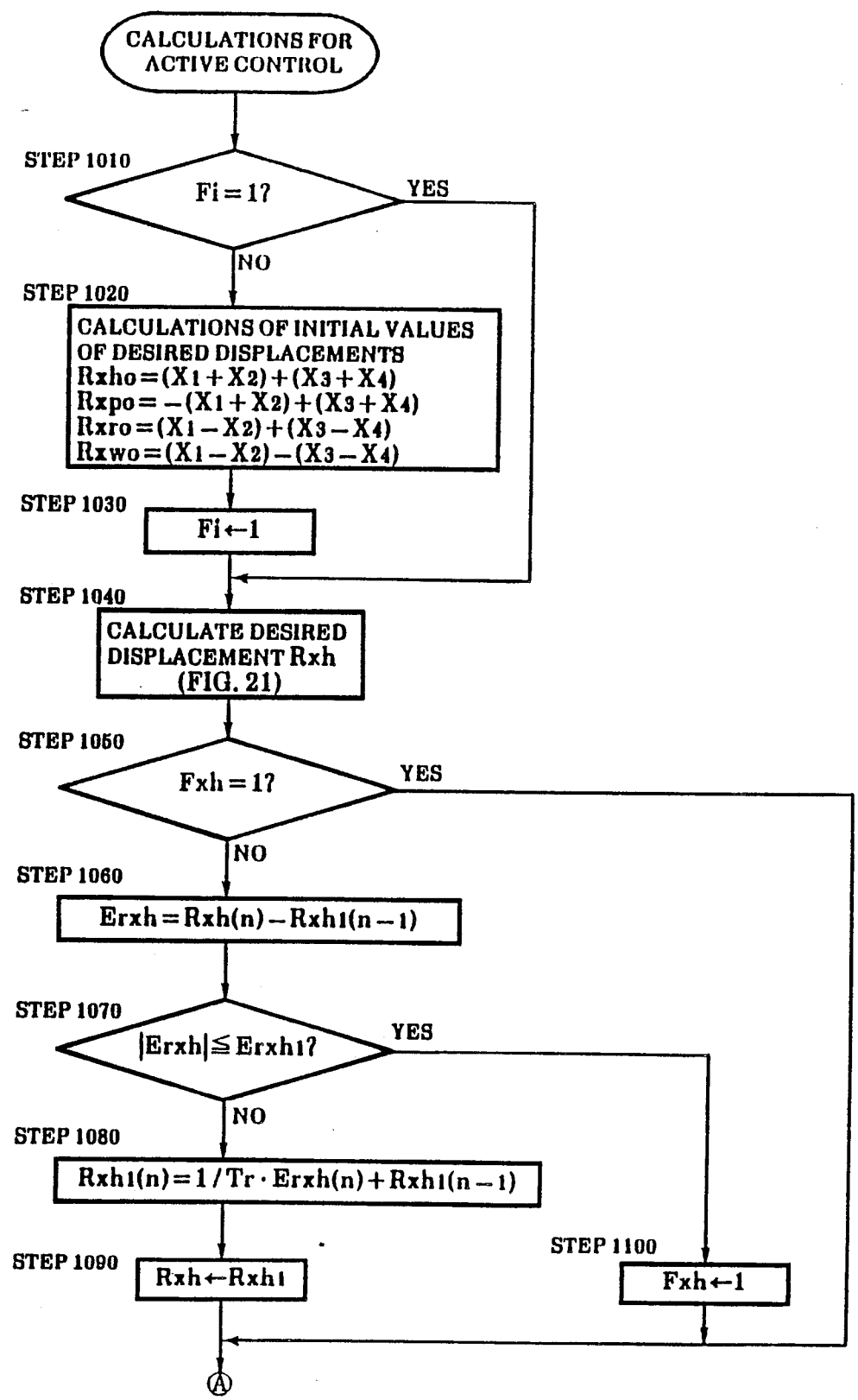
Figure 34B:
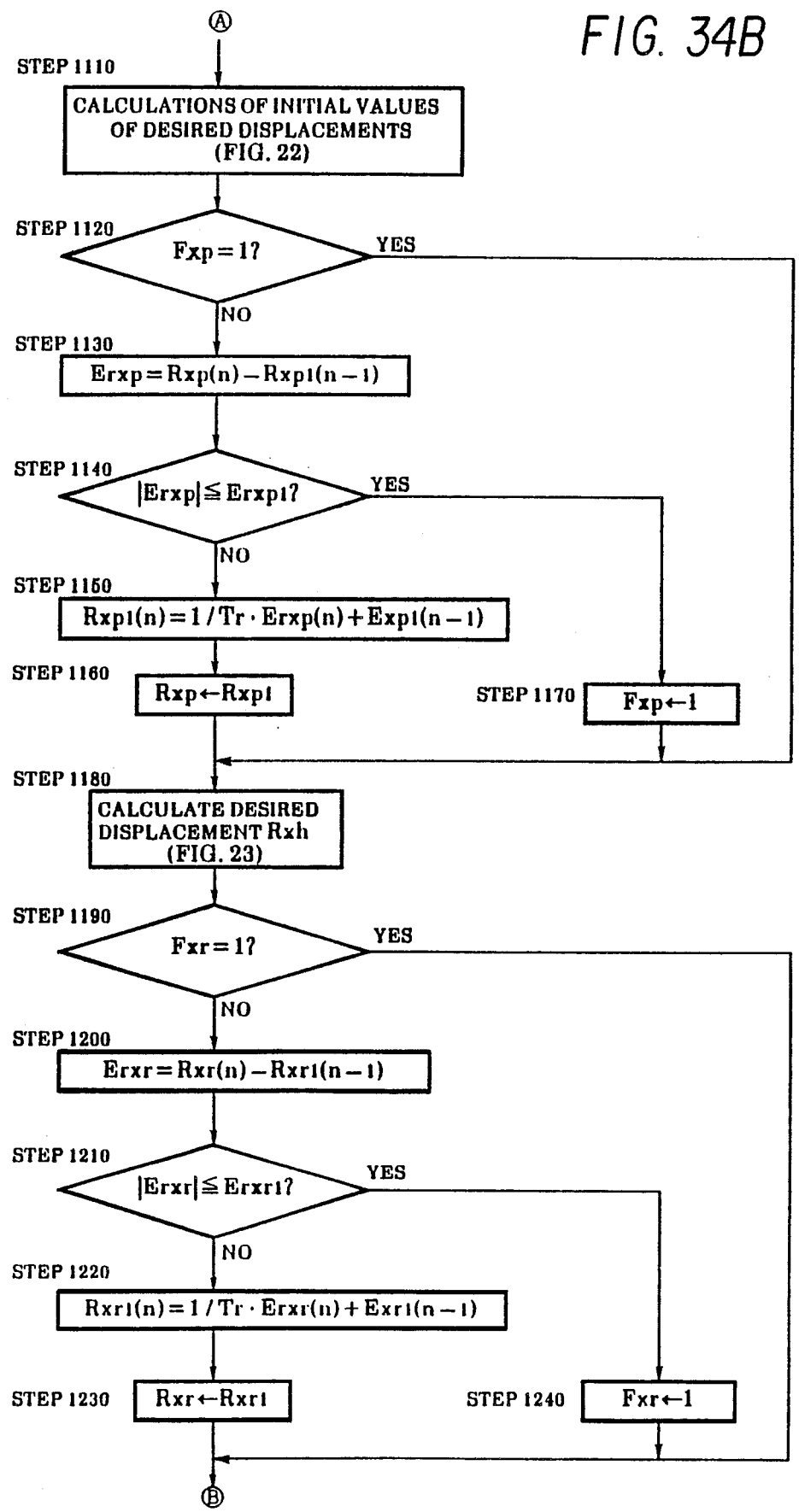
Figure 34C:
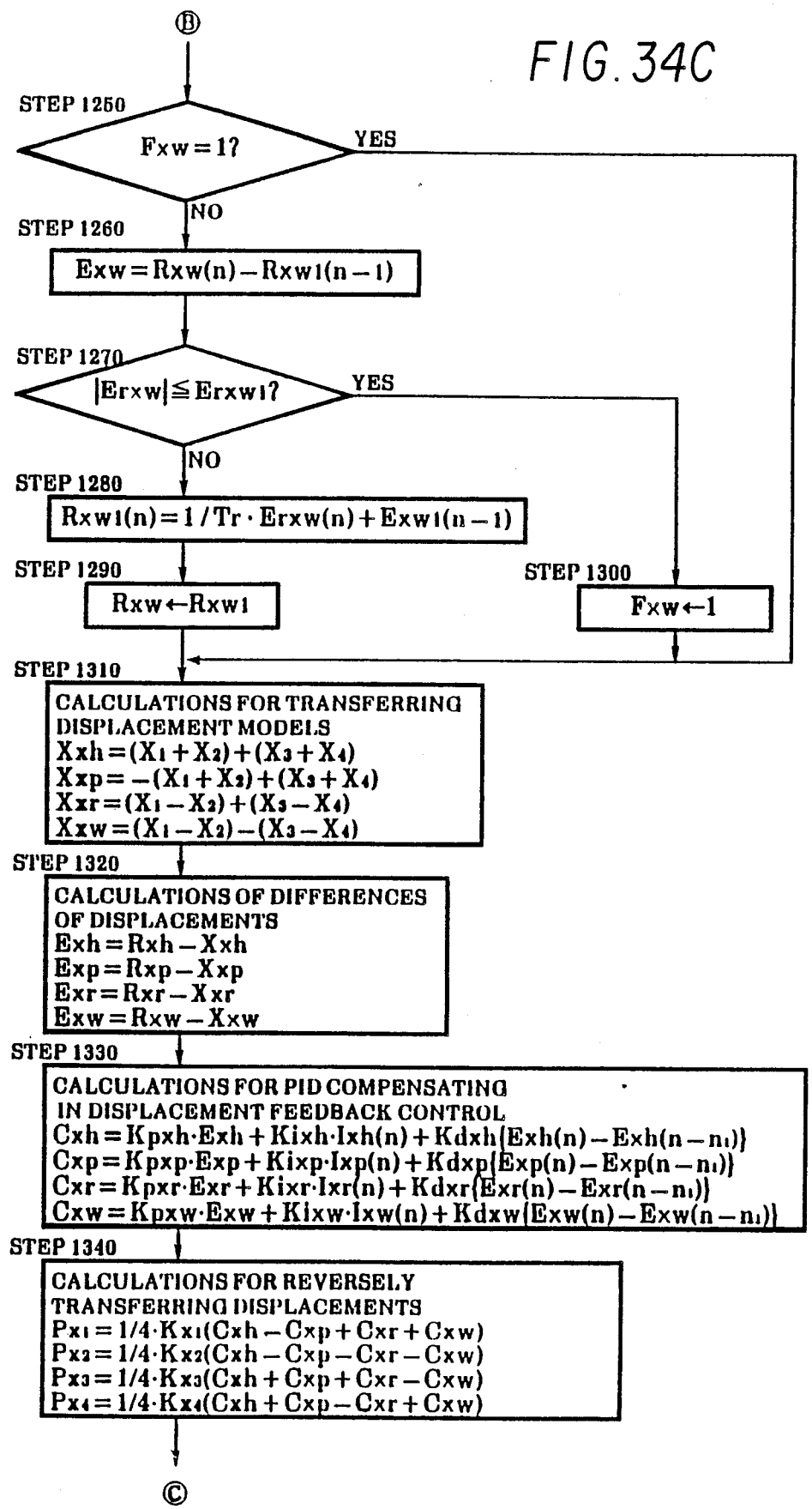

In the step 200, the Ts timer is stopped; according to the map corresponding to the graph shown in FIG. 32 stored in ROM 206, the standby pressures Pbi for the pressures Pi within the working fluid chambers 2FL, 2FR, 2RL and 2RR in the actuators are calculated and stored in RAM 208 from the vehicle heights Xi read in in the step 30; and standby pressure electric currents Ibi (i=1, 2, 3 and 4) are calculated according to the map corresponding to the graph shown in FIG. 33 which are supplied to the solenoids 78, 58, 82 and 80 incorporated in the variable flow restrictions 72, 54, 76 and 74 in the pressure control valves 34, 32, 38 and 36, respectively; and then the flow of control passes next to the step 210.

Next, referring to FIGS. 34A through 34D, the calculations for the active control carried out in the step 155 will be explained.

It is to be noted that in FIGS. 34A through 34D, a flag Fi relates to whether or not the initial values of desired displacements have already been calculated in the step 1020 referred to later, and one means that the initial values of the desired displacements have been calculated. Flags Fxh, Fxp, Fxr and Fxw concerns whether or not the absolute values of the differences Erxh, Erxp, Erxr and Erxw between the present and the last desired displacements of heave "Rxh", pitch "Rxp", roll "Rxr", and warp "Rxw" have ever been less than the corresponding reference values, and one means that the absolute values of the differences mentioned above have been equal to or less than the corresponding reference values.

In the step 1010, a decision is made as to whether or not the flag Fi is one. If a decision is made that the flag Fi is one, then the flow of control proceeds to the step 1040, and if a decision is made that the flag Fi is not one, then the flow of control passes to the next to the step 1020.

In the step 1020, the initial values $Rxh_0$, $Rxp_0$, $Rxr_0$ and $Rxw_0$ of the desired displacements are calculated according the following equations, and then the flow of control passes to the next step 1030.

$$Rxh_0 = (X_1+X_2)+(X_3+X_4)$$

$$Rxh_0 = -(X_1+X_2)+(X_3+X_4)$$

$$Rxh_0 = (X_1-X_2)+(X_3-X_4)$$

$$Rxh_0 = (X_1-X_2)-(X_3-X_4)$$

In the step 1030, the flag Fi is set to one, and next the flow of control passes to the step 1040.

In the step 1040, a desired value Rxh of heave is calculated based upon the map corresponding to the graph shown in FIG. 21, thereafter the flow of control passes to the next step 1050.

In the step 1050, a decision is made as to whether or not the flag Fxh is one. If a decision is made that the flag Fxh is one, then the flow of control proceeds the step 1110, and if a decision is made that the flag Fxh is not one, then the flow of control passes next to the step 1060.

In the step 1060, letting Rxh (n) denote the present desired displacement calculated in the step 1040 and $Rxh_1$ (n−1) represent the desired displacement calculated in the step 1080 explained later in the last cycle, and assuming that $Rxh_1$ (0) is equal to $Rxh_0$, the difference Erxh is calculated according to the equation below, and then the flow of control proceeds to the step 1070.

$$Erxh = Rxh(n) - Rxh_1(n-1)$$

In the step 1070, a decision is made as to whether or not the absolute value of the difference Erxh is equal to or less than its reference value $Erxh_1$. If a decision is made that the absolute value of the difference Erxh is equal to or less than $Erxh_1$, then the flow of control proceeds to the step 1100, and if a decision is made that the absolute value of Erxh is higher than $Erxh_1$, then the flow of control passes to the next step 1080.

In the step 1080, letting Tr represent a time constant, compensated desired displacement $Rxh_1$ (n) is calculated according to the following equation, and thereafter the flow of control proceeds to the next step 1090.

$$Rxh_1(n) = 1/Tr \cdot Erxh(n) + Rxh_1(n-1)$$

In the step 1090, the desired displacement Rxh is overwritten with the compensated value which was calculated in the step 1080 and then the flow of control passes to the step 1110.

In the 1100, the flag Fxh is set to one, and then the flow of control passes next to the step 1110.

In the steps 1110 through 1170, the desired value Rxp of pitch is calculated in the same manner as in the above mentioned steps 1040 through 1100 except that the desired value Rxp of pitch is calculated based upon the map corresponding to the graph shown in FIG. 9 in the step 1110, and then the flow of control proceeds to the step 1180.

In the steps 1180 through 1240, the desired value Rxr of roll is calculated in the same manner as in the above mentioned steps 1040 through 1100 except that the desired value Rxr of roll is calculated based upon the map corresponding to the graph shown in FIG. 10 in the step 1180, and then the flow of control passes to the step 1250.

In the steps 1250 through 1300, the desired value Rxw of warp is calculated in the same manner as in the above mentioned steps 1050 through 1100 except that Rxw (n) in the step 1260 which is carried out for the first time is set to a constant which nearly equals to zero and having the same sign as that of $Rxp_1$ (0) (=Rxpo) and which is stored in ROM 206, then the flow of control proceeds to the step 1310.

It is to be noted that Rxw (n) may be zero when the step 1260 is carried out for the first time.

Thus, according to this embodiment, during the period when the pressures Ps within the high pressure flow line is less than the predeterminate value Pc, the pressures within the working fluid chambers in the actuators are adjusted to the standby pressures Pbi calculated in the step 200. In the transition period when the controlling mode is changed from the mode wherein the pressure within the high pressure flow line is equal to or less than the predeterminate value Pc and the pressures within the working fluid chambers in the actuators are controlled to the standby pressures to the active control mode wherein the pressures within the chambers are controlled by the feedback control of vehicle heights to the pressures determined according to the running conditions of the vehicle, the desired values Rxh, Rxp, Rxr and Rxw of heave, pitch, roll and warp, respectively, are gradually changed from the corresponding values set in the standby pressure control mode to the values determined according to the running conditions of the vehicle by the conduction of the steps 1010 through 1300, and, accordingly, the pressures within the working fluid chambers in the actuators are gradually changed from the standby pressures to the values determined according to the running conditions of the vehicle, so that the pressures within the working fluid chambers are avoided from rapidly changing and the vehicle body is prevented from changing its attitude due to the change in pressure.

While in the above described embodiment, standby pressures are calculated in the step 200 and standby pressure electric currents Ibi supplied to the pressure control valves are calculated from the calculated standby pressures based upon the map corresponding to the graph shown in FIG. 33, the standby pressures Pbi may be rewritten with the desired pressures Pui after the standby pressures Pbi have been calculated in the step 200 and the flag Fs has been set to one in the step 210, and then the flow of control may be transferred to the step 1400.

Again, while in the above described embodiment, standby pressures Pbi are calculated from the vehicle heights detected by the vehicle height sensors based upon the map corresponding to the graph shown in FIG. 32, the pressures Pi within the working fluid chambers 2FL, 2FR, 2RL and 2RR detected by the pressure sensors 199FL, 199FR, 199RL and 199RR may be utilized as standby pressures Pbi in the step 200.

The sixth preferred embodiment

Figure 35:
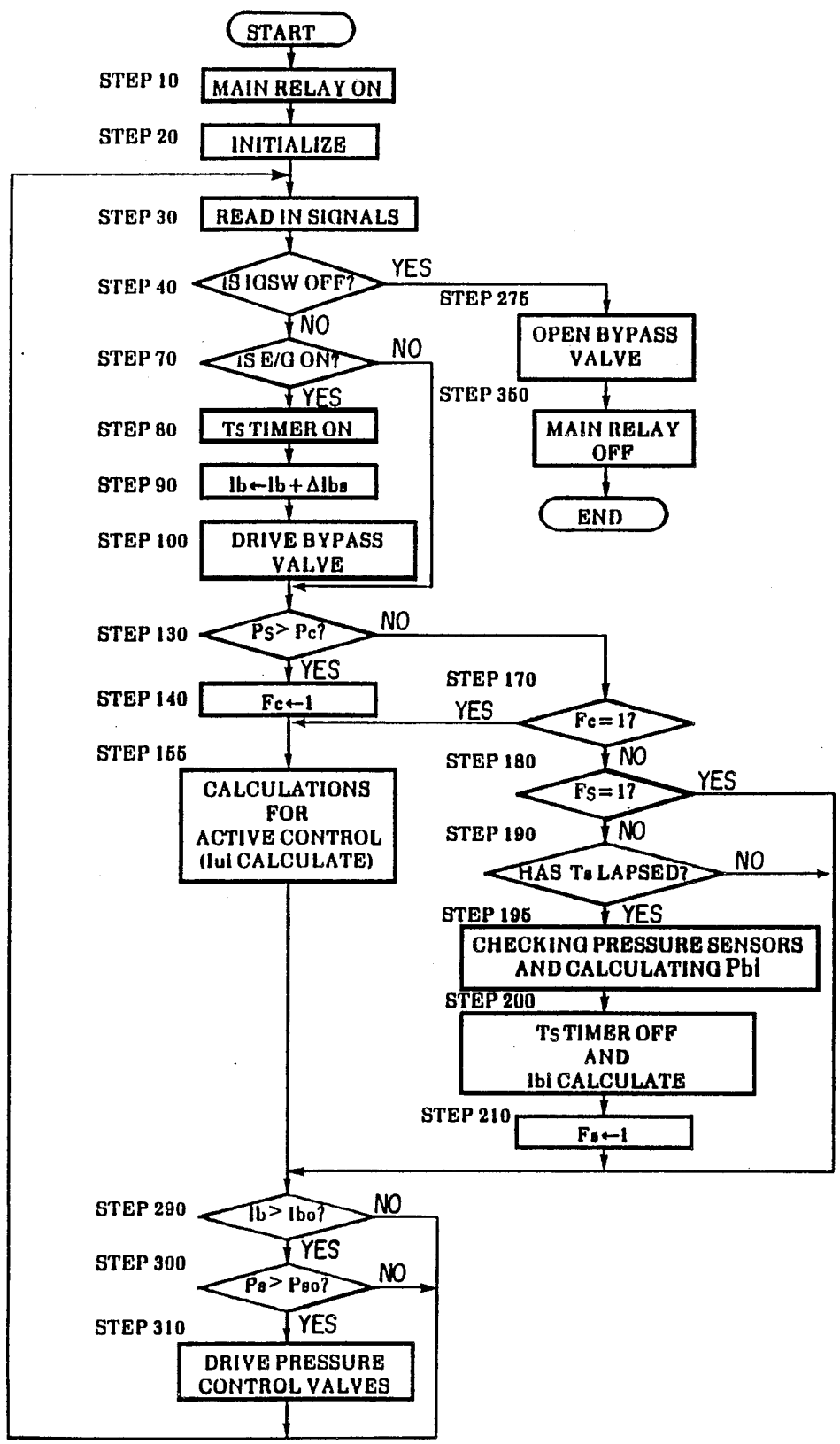
FIG. 35 is a general flow chart, similar to FIG. 31, showing a control flow of a cyclical program carried out in the sixth preferred embodiment of the hydraulic suspension system according to the present invention.
Figure 36:
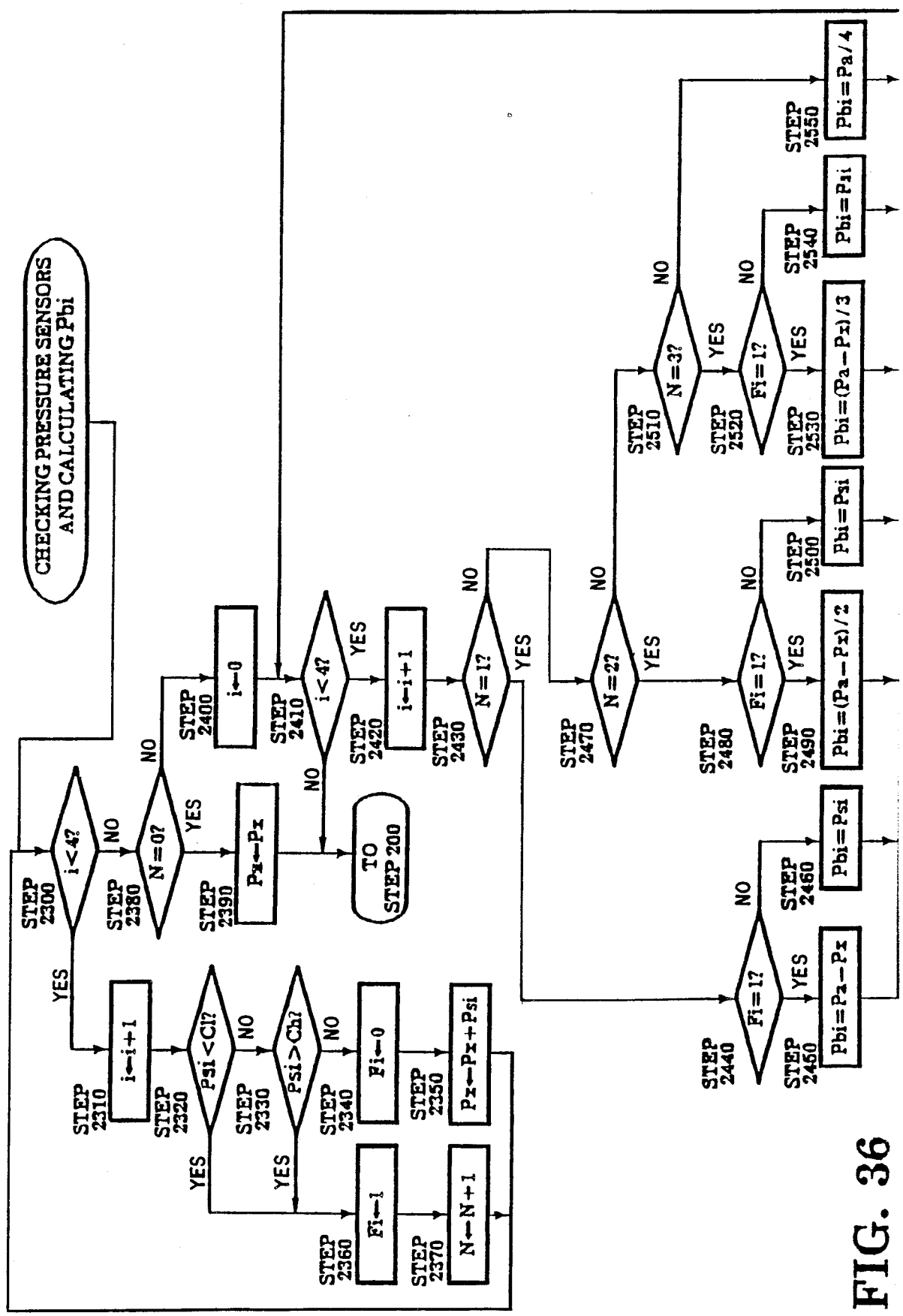
FIG. 36 is a flow chart showing the subroutine for checking pressure sensors and calculating the standby pressures Pbi in the sixth embodiment of the hydraulic suspension system.

FIG. 35 is a general flow chart showing a control routine of a cyclical program in the sixth embodiment, and FIG. 36 is a flow chart showing a subroutine for checking the pressure sensors and calculating the standby pressures Pbi which is carried out in the step 195 in the flow chart shown in FIG. 35.

It is to be understood that in this embodiment the calculations for active control may be performed in the same manner as in the third embodiment described above.

Next referring to FIG. 36, the routine for checking the pressure sensors and calculating the standby pressures Pbi is explained.

In this connection, it is to be noted that in FIG. 36, "i" (i=1, 2, 3 or 4) represent the front left, the front right, the rear left or the rear right vehicle wheels, respectively, Psi (i=1, 2, 3 or 4) denote the pressures within the working fluid chambers detected by the pressure sensors 199FL, 199FR, 199RL or 199RR, respectively; Px represents the total value of the pressures detected by normal pressure sensors; Pa denotes the total value of the pressures within the working fluid chambers 2FL, 2FR, 2RL and 2RR in the for actuators and ROM 206 stores the value of Pa under the condition where the load of the vehicle is at a normal level in such a case of two passengers; N represents the number of pressure sensors which have any fault; flags Fi (i=1, 2, 3 or 4) concern whether or not the corresponding pressure sensors have any fault and one means that the corresponding pressure sensor has any fault.

In the step 2300, a decision is made as to whether or not i is less than 4. If a decision is made that i is not less than 4, then the flow of control passes to the step 2380, and if a decision is made that i is less than 4, then the flow of control passes next to the step 2310.

In the step 2310, i is increased in number by one, and next the flow of control passes to the step 2320.

In the step 2320, a decision is made as to whether or not the pressure Psi within the working fluid chambers detected by the associated pressure sensor is lower than the reference value Cl. If a decision is made that Psi is lower than Cl, then the flow of control passes to the step 2360, and if a decision is made that Psi is not lower than Cl, then the flow of control proceeds to the next step 2330.

In the step 2330, a decision is made that the pressure Psi within the working fluid chamber detected by the associated pressure sensor is higher than a reference value Ch. If a decision is made that Psi is higher than Ch, then the flow of control passes to the step 2360, and if a decision is made that Psi is not higher than Ch, then the flow of control proceeds to the next step 2340.

It should be noted that the reference values Cl and Ch may be constants which the pressures within the working fluid chambers can not reach so long as the suspension system operates normally.

In the step 2340, the flag Fi is reset to zero, and then the flow of control is transferred to the step 2350.

In the step 2350, the total value Px of the pressures detected by the normal pressure sensors is overwritten with Px+Psi, and thereafter the flow of control returns to the step 2300.

In the step 2360, the flag Fi is set to one, and then the flow of control passes next to the step 2370.

In the step 2370, N which represents the number of the pressure sensors having any fault is increased in number by one, and then the flow of control returns to the step 2300.

In the step 2380, a decision is made as to whether or not N is zero. If a decision is made that N is not zero, then the flow of control passes to the step 2400, and if a decision is made that N is zero, then the flow of control proceeds to the next step 2390.

In the step 2390, the total value Pa of the pressures is overwritten with Px, and thereafter the flow of control is transferred to the step 200 shown in FIG. 35.

In the step 2400, i is reset to zero, and then the flow of control passes to the next step 2410.

In the step 2410, a decision is made as to whether or not i is less than 4. If a decision is made that i is not less than 4, then the flow of control is transferred to the step 200 shown in FIG. 35, and if a decision is made that i is less than 4, then the flow of control proceeds to the next step 2420.

In the step 2420, i is increased in number by one, and then the flow of control passes next to the step 2430.

In the step 2430, a decision is made as to whether or not N is one. If a decision is made that N is not one, then the flow of control is transferred to the step 2470, and if a decision is made that N is one, then the flow of control proceeds to the next step 2440.

In the step 2440, a decision is made as to whether or not the flag Fi is one. If a decision is made that the flag Fi is not one, then the flow of control proceeds to the step 2460, and if a decision is made that the flag Fi is one, then the flow of control passes next to the step 2450.

In the step 2450, the standby pressure Pbi is set according to the following equation, and thereafter the flow of control is returned to the step 2410.

$Pbi=Pa-Px$

In the step 2460, the standby pressure Pbi is set to Psi, and then the flow of control returns to the step 2410.

In the step 2470, a decision is made as to whether or not N is two. If a decision is made that N is not two, then the flow of control proceeds to the step 2510, and if a decision made that N is two, then the flow of control passes to the next step 2480.

In the step 2480, a decision is made as to whether or not the flag Fi is one. If a decision is made that the flag Fi is not one, then the flow of control proceeds to the step 2500, and if a decision is made that the flag Fi is one, then the flow of control passes next to the step 2490.

In the step 2490, the standby pressure Pbi is set according to the following equation, and thereafter the flow of control is returned to the step 2410.

$Pbi=(Pa-Px)/2$

In the step 2500, the standby pressure Pbi is set to Psi, and then the flow of control is returned to the step 2410.

In the step 2510, a decision is made as to whether or not N is three. If a decision is made that N is not three, then the flow of control passes to the step 2550, and if a decision is made that N is three, then the flow of control passes to the next step 2520.

In the step 2520, a decision is made as to whether or not the flag Fi is one. If a decision is made that the flag Fi is not one, then the flow of control proceeds to the step 2540, and if a decision is made that the flag Fi is one, then the flow of control passes to the next step 2530.

In the step 2530, the standby pressure Pbi is set according to the following equation, and thereafter the flow of control returns to the step 2410.

$Pbi=(Pa-Px)/3$

In the step 2540, the standby pressure Pbi is set to Psi, and then the flow of control is returned to the step 2410.

In the step 2550, the standby pressure Pbi is set according to the following equation, and thereafter the flow of control is transferred to the step 2410.

$Pbi=Pa/4$

Thus in this sixth embodiment in the steps 2300 through 2370 decisions are made as to whether or not the pressure sensors are normal and the number of the abnormal sensors are determined. In the steps 2400 through 2550, for the vehicle wheels whose corresponding pressure sensors are normal the standby pressures Pbi are set to the values Psi detected by the associated pressure sensors, while for the vehicle wheels whose corresponding pressure sensors are abnormal the standby pressures Pbi are calculated and presumed from both the total value Pa of the pressures within the working fluid chambers in the four actuators and the total value Px of the pressures Psi detected by the normal pressure sensors.

The seventh preferred embodiment

Figure 37:
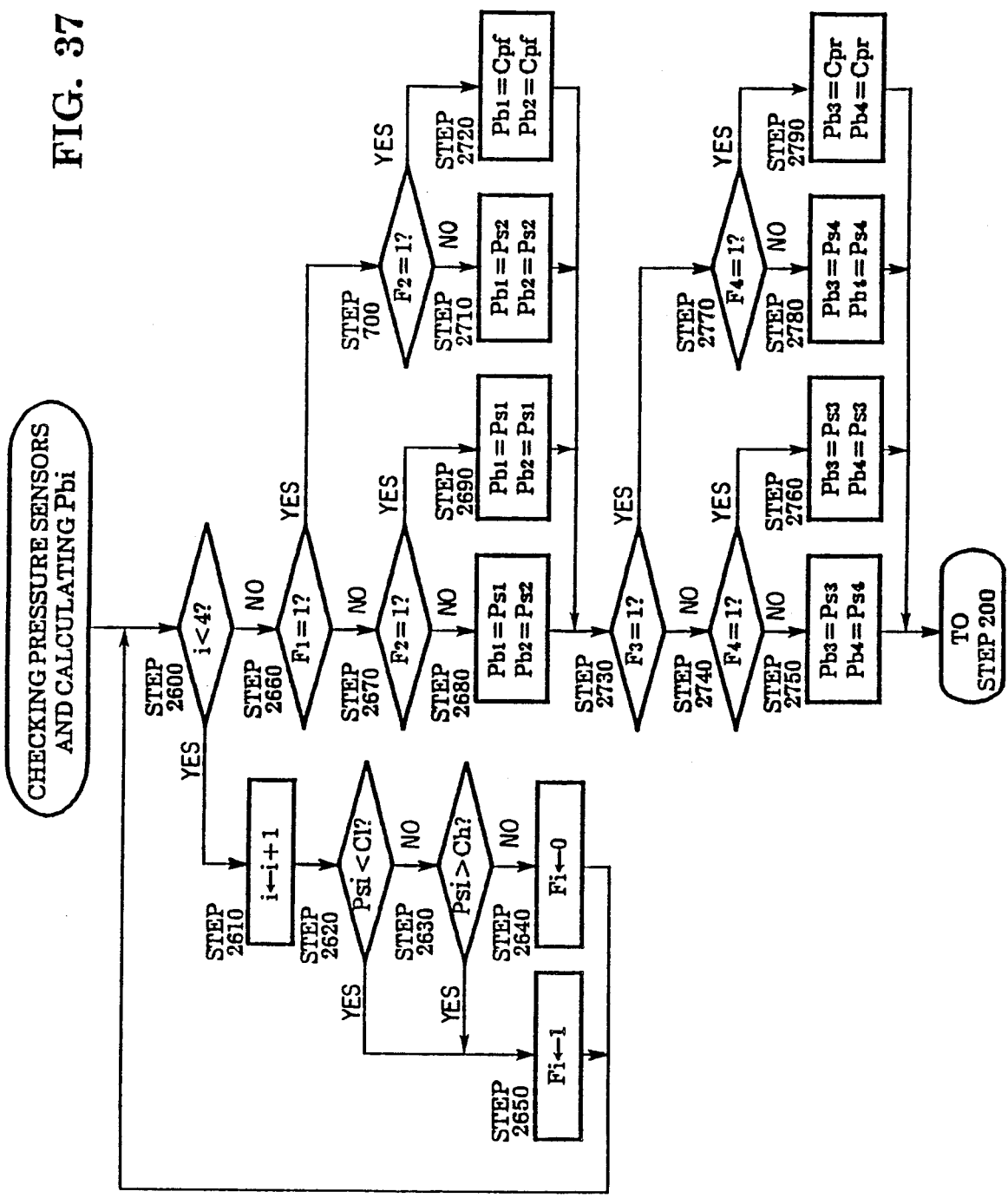
FIG. 37 is a flow chart, similar to FIG. 36, showing a subroutine for checking pressure sensors and calculating the standby pressures Pbi in the seventh preferred embodiment of the hydraulic suspension system according to the present invention.

FIG. 37 is a flow chart, similar to FIG. 36, showing the subroutine for checking the pressure sensors and calculating the standby pressures Pbi in the seventh embodiment of the present invention.

In FIG. 37, Cpf and Cpr represent the pressures within the working fluid chambers in the actuators for the front vehicle wheels and the rear vehicle wheels, respectively, when the vehicle is under a standard loaded condition. Flags $F_1$, $F_2$, $F_3$ and $F_4$ corresponding to the flags Fi in FIG. 36 relate to whether or not the corresponding pressure sensors have any fault and one denotes that the corresponding pressure sensor has any fault. In FIG. 37, as will be realized, the step 2600, 2610, 2620, 2630, 2640 and 2650 correspond to the steps 2300, 2310, 2320, 2330, 2340 and 2360 in the flow chart shown in FIG. 36, and accordingly detailed descriptions for these steps are not given here for the sake of simplicity.

In the step 2660, a decision is made as to whether or not the flag $F_1$ is one. If a decision is made that the flag $F_1$ is one, then the flow of control proceeds to the step 2700, and if a decision is made that the flag $F_1$ is not one, then the flow of control passes to the next step 2670.

In the step 2670, a decision is made as to whether or not the flag $F_2$ is one. If a decision is made that the flag $F_2$ is one, then the flow of control proceeds to the step 2690, and if a decision is made that the flag $F_2$ is not one, then the flow of control passes next to the step 2680.

In the step 2680, the standby pressures $P_1$ and $P_2$ are set to $Ps_1$ and $Ps_2$, respectively, detected by the associated pressure sensors, and then the flow of control is transferred to the step 2730.

In the step 2690, both the standby pressures $P_1$ and $P_2$ are set to the pressure $Ps_1$ detected by the pressure sensor for the front left vehicle wheel, and the the flow of control is transferred to the step 2730.

In the step 2700, a decision is made as to whether or not the flag $F_2$ is one. If a decision is made that the flag $F_2$ is one, then the flow of control proceeds to the step 2720, and if a decision is made that the flag $F_2$ is not one, then the flow of control passes to the next step 2710.

In the step 2710, both the standby pressures $P_1$ and $P_2$ are set to the pressure $Ps_2$ detected by the pressure sensor for the front right vehicle wheel, and then the flow of control passes to the step 2730.

In the step 2720, both the standby pressures $P_1$ and $P_2$ are set to Cpf, and then the flow of control passes to the next step 2730.

In the step 2730, a decision is made as to whether or not the flag $F_3$ is one. If a decision is made that the flag $F_3$ is one, then the flow of control proceeds to the step 2770, and if a decision is made that the flag $F_3$ is not one, then the flow of control passes to the next step 2740.

In the step 2740, a decision is made as to whether or not the flag $F_4$ is one. If a decision is made that the flag $F_4$ is one, then the flow of control proceeds to the step 2760, and if a decision is made that the flag $F_4$ is not one, then the flow of control passes to the next step 2750.

In the step 2750, the standby pressures $P_3$ and $P_4$ are set to the pressures $Ps_3$ and $Ps_4$, respectively, detected by the associated pressure sensors, and thereafter the flow of control is transferred to the step 200 shown in FIG. 35.

In the step 2760, both the standby pressure $P_3$ and $P_4$ are set to the pressure $Ps_3$ detected by the pressure sensor for the rear left vehicle wheel, and thereafter the flow of control is transferred to the step 200.

In the step 2770, a decision is made as to whether or not the flag $F_4$ is one. If a decision is made that the flag $F_4$ is one, then the flow of control proceeds to the step 2790, and if a decision is made that the flag $F_4$ is not one, then the flow of control passes to the next step 2780.

In the step 2780, both the standby pressures $P_3$ and $P_4$ are set to the pressure $Ps_4$ detected by the pressure sensor for the rear right vehicle wheel, and thereafter the flow of control is transferred to the step 200.

In the step 2790, both the standby pressures $P_3$ and $P_4$ are set to Cpr, and then the flow of control is transferred to the step 200.

Thus in this seventh embodiment, in the step 2600 through 2650 a decision is made as to whether or not the pressure sensors are normal, and in the steps 2660 through 2790, in the case where either of the left and right pressure sensors is abnormal, the corresponding standby pressure Pbi is set to the value which is the same as that within the working fluid chamber in the actuator on the opposite side, while in the case where the left and the right pressure sensors are abnormal the standby pressures are set to the standard pressure Cpf or Cpr.

In the sixth and seventh embodiments, in the initial stage when the suspension system is started to operate, the standby pressures Pbi for the pressure control valves are set to the pressures Psi detected by the pressure sensors in the step 195 before the pressure Ps within the high pressure flow line is increased to a level higher than the reference value Pc in the steps 90 and 100 and the cut-off valves are opened, so that the shock is prevented from occurring when the cut-off valves are opened in response to the pressure Ps higher than Pc and the pressures within the working fluid chambers in the actuators begin to be controlled by the corresponding pressure control valves.

Thus, even though any fault occurs in any of the pressure sensors, the standby pressure Pbi within the working fluid chamber in the actuator to which the abnormal pressure sensor is associated is set as mentioned above to a value which is substantially equal to the actual level within that chamber, and accordingly the standby pressures Pbi are avoided from being set to levels such as zero or a maximum which are far different from the actual levels based upon the values indicated by pressure sensors having any fault such as opening, short or the like, and the shock is prevented from occurring due to the above when the cut-off valves are opened.

While the pressure control means a pressure control valves in the above mentioned embodiments, they may be flow rate control valves as long as they can control the flow rate of the working fluid supplied to and discharged from the working fluid chambers to control the pressures within the chambers.

While in the above mentioned embodiment, the working fluid supply discharge passages are common to each other between the pressure control valves and the working fluid chambers in the actuators, these passages may be separated from each other at least partially between the control valves and the working fluid chambers.

Although the present invention has been shown and described in detail in terms of particular preferred embodiments, the present invention is not restricted to the embodiments, and it will be seen by those skilled in the relevant art that various modifications may be made without departing from the scope of the present invention.

What is claimed is:

1. A hydraulic suspension system for a vehicle, comprising:
   a plurality of hydropneumatic actuators each being adapted to increase and decrease the vehicle height as respective results of the supply and the discharge of working fluid to and from its working fluid chamber;
   working fluid supply passage means for supplying working fluid at supply pressue to said working fluid chambers;
   working fluid discharge passage means for discharging working fluid from said working fluid chambers;

cut-off valves each being provided in said working fluid supply passage means and said working fluid discharge passage means andbeing adapted to respond to said supply pressure and to remain in its closed position whenever said supply pressure is not more than a first predeterminate value;

pressure control means each being provided in said supply passage means and said discharge passage means and being adapted to control the supply and the discharge of the working fluid to and from said working fluid chamber to regulate the pressure within said chamber;

a first control means for controlling said pressure control means;

means for determining the pressure within said working fluid chambers; and a means for detecting the supply pressure;

wherein said first control means is so adapted that its instructing pressure for said pressure control means may substantially be equal to the pressure within the associated working fluid chambers determined by said pressure determining means at least until said supply pressure reaches a second predeterminate pressure which is equal to or higher than said first predeterminate value.

2. A hydraulic suspension system for a vehicle according to claim 1, each cut-off valve is provided between said pressure control means and said actuator.

3. A hydraulic suspension system for a vehicle according to claim 1, each cut-off valve is provided on the opposite side from said pressure control means relative to said actuator.

4. A hydraulic suspension system for a vehicle according to claim 1, said pressure determining means are pressure detecting means adapted to detect the pressures within the associated working fluid chambers.

5. A hydraulic suspension system for a vehicle according to claim 4, further comprising means for determining the running conditions of said vehicle, a second control means which is adapted gradually to reduce the pressure warp, if any, among the pressures within said working fluid cambers substantially to zero after the control by said first control means has been completed, and a third control means which is adapted to control said pressure control means according to the running conditions of said vehicle after the control by said second control means has been completed.

6. A hydraulic suspension system for a vehicle according to claim 4, further comprising means for determining the running conditions of said vehicle and vehicle height detecting means for detecting the vehicle heights at the locations corresponding to said actuators, said first control means being adapted to control said pressure control means by the feedback control based upon the vehicle heights detected by said vehicle height detecting means so that the controlling pressures of said pressure control means may be desired pressures after said supply pressure has exceeded said second predeterminate value, and said desired pressures being gradually changed from the values which are substantially equal to the pressures within said working fluid chambers before said supply pressure exceeds said second predeterminate value to the values determined by the running conditions of said vehicle.

7. A hydraulic suspension system for a vehicle according to claim 4, further comprising means for detecting any fault in said pressure detecting means and said first control means is adapted to presume the pressure to be detected by an abnormal pressure detecting means, if any, based upon the pressures detected by the normal pressure detecting means and to control said pressure control means corresponding to the abnormal pressure detecting means so that the controlling pressure thereof may substantially be equal to the presumed pressure.

8. A hydraulic suspension system for a vehicle according to claim 1, said pressure determining means include vehicle height detecting means for detecting the vehicle heights at the locations corresponding to said actuators and are adapted to presume the pressures within said working fluid chambers according to the vehicle heights detected by said vehicle height detecting means.

9. A hydraulic suspension system for a vehicle according to claim 8, further comprising means for determining the running conditions of said vehicle, a second control means which is adapted gradually to reduce the pressure warp, if any, among the pressures within said working fluid cambers substantially to zero after the control by said first control means has been completed, and a third control means which is adapted to control said pressure control means according to the running conditions of said vehicle after the control by said second control means has been completed.

10. A hydraulic suspension system for a vehicle according to claim 8, further comprising means for determining the running conditions of said vehicle, said first control means being adapted to control said pressure control means by the feedback control based upon the vehicle heights detected by said vehicle height detecting means so that the controlling pressures of said pressure control means may be desired pressures after said supply pressure has exceeded said second predeterminate value, and said desired pressures being gradually changed from the values which are substantially equal to the pressures within said working fluid chambers before said supply pressure exceeds said second predeterminate value to the values determined by the running conditions of said vehicle.

* * * * *